US009696175B2

(12) United States Patent
Hansen et al.

(10) Patent No.: US 9,696,175 B2
(45) Date of Patent: Jul. 4, 2017

(54) CENTRALLY MANAGED WAYPOINTS ESTABLISHED, COMMUNICATED AND PRESENTED VIA VEHICLE TELEMATICS/INFOTAINMENT INFRASTRUCTURE

(71) Applicant: GM GLOBAL TECHNOLOGY OPERATIONS LLC, Detroit, MI (US)

(72) Inventors: Cody R. Hansen, Shelby Township, MI (US); David M. Zande, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 14/885,106

(22) Filed: Oct. 16, 2015

(65) Prior Publication Data
US 2017/0108348 A1     Apr. 20, 2017

(51) Int. Cl.
G01C 21/36     (2006.01)
H04L 29/08     (2006.01)
H04W 4/04     (2009.01)

(52) U.S. Cl.
CPC .......... G01C 21/3682 (2013.01); H04L 67/12 (2013.01); H04W 4/046 (2013.01)

(58) Field of Classification Search
CPC .......... B60W 30/00; H04W 4/02; G06F 15/16
See application file for complete search history.

(56) References Cited

U.S. PATENT DOCUMENTS

| 5,948,040 | A * | 9/1999 | DeLorme | G01C 21/36 340/990 |
| 8,160,064 | B2 * | 4/2012 | Kokernak | H04N 7/17318 370/389 |
| 8,731,821 | B2 * | 5/2014 | Sheynblat | G01C 21/3679 701/400 |
| 9,261,374 | B2 * | 2/2016 | Mundinger | G06Q 10/047 |
| 2007/0219706 | A1 * | 9/2007 | Sheynblat | G01C 21/3679 701/532 |
| 2012/0203457 | A1 * | 8/2012 | Casey | H04W 4/02 701/533 |
| 2013/0226731 | A1 | 8/2013 | MacNeille et al. | |
| 2013/0262479 | A1 * | 10/2013 | Liang | H04W 4/021 707/748 |

(Continued)

Primary Examiner — Angela Ortiz
Assistant Examiner — Alex C Dunn
(74) Attorney, Agent, or Firm — Leydig, Voit & Mayer, Ltd.

(57) ABSTRACT

A method is described for incorporating a new waypoint into a current trip. The method includes configuring a trip definition and thereafter determining a proposed POI based upon: the trip definition, and a collection of potential proposed POI instances. The waypoint server system processes the collection of potential proposed POI instances, to render the proposed POI, by: (1) establishing POI ratings for individual ones of the collection of potential proposed POI instances based at least in part upon: the delay factor, and an estimate of additional delay arising from adding the individual POI to the current trip route; (2) establishing a rank ordering of the individual ones of the collection of potential proposed POI instances based upon the POI ratings; and (3) rendering the proposed POI from the rank ordering of the individual ones of the collection of potential proposed POI instances.

20 Claims, 9 Drawing Sheets

(56) References Cited

U.S. PATENT DOCUMENTS

| | | | | |
|---|---|---|---|---|
| 2013/0262661 | A1* | 10/2013 | Malboubi | H04L 41/142 709/224 |
| 2013/0325839 | A1* | 12/2013 | Goddard | G06F 17/30867 707/708 |
| 2014/0310075 | A1* | 10/2014 | Ricci | H04W 48/04 705/13 |
| 2014/0323163 | A1* | 10/2014 | Venkatraman | G01S 5/0252 455/457 |
| 2015/0025799 | A1* | 1/2015 | Jackson | G01C 21/00 701/519 |
| 2015/0026006 | A1* | 1/2015 | Jackson | G01C 21/00 705/26.8 |
| 2016/0044571 | A1* | 2/2016 | Choi | G08G 1/096811 370/235 |
| 2016/0076899 | A1* | 3/2016 | MacNeille | G01C 21/3469 701/428 |

* cited by examiner

FIG. 3A

| |
|---|
| 300 Vehicle_ID |
| 302 Primary Occupant/Driver ID |
| 304 Secondary Driver(s) ID(s) (up to "m") |
| 305 Primary/Secondary Passenger(s) ID(s) (up to "n") |
| 306 Fuel Capacity |
| 308 Fuel Economy (highway/city) |
| 310 Vehicle-Vehicle Comm. Capabilities |
| 312 Vehicle-Travel Info Source Comm. Capabilities |
| 314 Stored Trip IDs (Repeated/Frequent/Saved) and time/day(s)/date – Linked to Trip Table |

FIG. 3B

| |
|---|
| 320 Occupant_ID |
| 322 Authentication Information |
| 324 Age |
| 326 Gender |
| 328 Weight |
| 330 Loyalty Programs |
| 332 Electronic Payment Account(s) |
| 334 Personalized POIs (Categorized Rated/Ranked) |
| 336 POI Proposal Preferences |
| 338 Accepted Proposed POIs/Offers |
| 340 Blocked POIs |
| 342 Driving Characteristics |
| 344 POI Rating Threshold/Proposal Frequency |
| 346 Liked/Disliked Proposed POIs |

FIG. 3C

| |
|---|
| 350 POI_ID (including site ID) |
| 351 Uniqueness score (rare, common) |
| 352 Authentication Information |
| 354 POI type/classification |
| 356 location (GNSS coordinates) |
| 358 business hours (availability) |
| 360 available capacity |
| 362 amenities (e.g. wi-fi, restrooms, etc.) |
| 364 menu |
| 366 ratings |
| 368 special offers |
| 370 Loyalty/Reward Programs |
| 372 Sponsor Agreements (terms) |
| 374 Estimated time duration for visit |
| 376 Contact information |

FIG. 3D

| |
|---|
| 380 POI_Type_ID |
| 382 POI Type Name (text) |
| 384 POI Type Rating Formula |
| 386 POI Type Rating Value |
| 388 POI Instance Rating Formula |

| |
|---|
| 400 Trip_ID |
| 401 Trip Origin |
| 402 Trip Origin start time/day date |
| 404 Trip Destination |
| 405 Destination Type |
| 406 Final Destination time/day date |
| 408 Unique Trip Name |
| 409 Current Route |
| 410 Current Route ETA |
| 411 Current Driver Identification |
| 412 Current Passenger(s) Identification(s) |
| 413 Vehicle_ID (see FIG. 3A) |
| 414 Trip Scheduling/Frequency (repeating, weekday daily, weekly) |
| 416 Driving restrictions (e.g. daytime) |
| 418 Designated waypoints (list of pointers to Waypoint table entries) |
| 420 Delay factors (delay flexibility at currently scheduled waypoints/endpoint) |
| 422 Type of Trip (e.g. vacation, business, etc.) |
| 424 Rating Threshold/POI Proposal Frequency (e.g. based on individual Occupant thresholds/frequencies) |
| 426 Proposed POIs (for display) |

FIG. 3E

| |
|---|
| 430 Waypoint_ID |
| 432 Parent POI_ID (POI table entry) |
| 434 Parent Trip_ID (Trip table entry) |
| 436 Time of Arrival |
| 438 Time of Departure |
| 440 Purpose (refuel, stretch/refresh, sleep, washroom, eat, shop, recreation) |
| 442 POI Ordering Message |
| 444 Configured Alerts (e.g. Pre-order time period, expected delay in arrival) |
| 446 Waypoint POI rating |
| 448 Delay Factor Threshold (waypoint) |

FIG. 3F

CENTRALLY MANAGED WAYPOINTS ESTABLISHED, COMMUNICATED AND PRESENTED VIA VEHICLE TELEMATICS/INFOTAINMENT INFRASTRUCTURE

TECHNOLOGY FIELD

The present disclosure relates generally to telematics systems and more specifically to using telematics systems within vehicles, in conjunction with a variety of data sources/databases and configurable decision logic to manage and selectively present waypoint notifications based upon preconfigured travel information, preferences of identified vehicle occupants, and a current status of a scheduled trip to a designated destination along a specified navigation route.

BACKGROUND

Telematics units within mobile vehicles provide subscribers with connectivity to a telematics service provider (TSP). The TSP provides subscribers with an array of services ranging from emergency call handling and stolen vehicle recovery to diagnostics monitoring and turn-by-turn navigation. Upon activation, the telematics unit provides a subscriber with a wide variety of telematics services rendered by a variety of networked providers.

The telematics services provide, among other things, information regarding businesses and amenities located in the vicinity of the user. For example, a TSP permits a user to request a listing of various service providers (and associated locations) in the vicinity of a specified location (current or intended future) of the user. To facilitate providing such information to the user, a TSP obtains maps and information regarding businesses and amenities.

During a trip to an intended destination a vehicle passes a variety of potential places of interest (POI) for the vehicle's occupants. A POI may be a gas station, a restaurant, a store, etc. Waypoints are stopping locations along a route to a specified destination. More particularly, waypoints correspond to places along a vehicle route to the specified destination where one or more occupants of the vehicle perform a needed/desired activity. Therefore, once a user has selected a POI, the selected POI becomes a waypoint along the vehicle route to the specified destination.

Waypoints are presently cumbersome to identify and select from thousands of potential POIs existing along a specified vehicle route. In many instances there are far too many POIs to reasonably present all the potential POIs to vehicle occupants. Effective selection and presentation of POIs that meet actual or contemplated needs of vehicle occupants enhances the utility of POI recommendation interfaces, with selection of a particular presented POI resulting in creating a new waypoint along the vehicle route. As a result of creating the new waypoint, the vehicle route and an associated time of arrival estimate may need to be updated.

Substantial effort has been expended to inform vehicle users and prevent/discourage activities by drivers that may lead to driver distraction. Maintaining driver activities within guidelines to minimize distraction is desirable, and providing functional interfaces that can be operated by a driver within recommended guidelines provides a balance between the needs of vehicle drivers and minimizing driver distraction when presenting POIs as selectable/potential new waypoints on a trip to a specified destination.

Providers of POI recommendation/notification systems are challenged to effectively present meaningful/reasonable POIs in a way that satisfactorily informs the vehicle occupant(s) of desirable/needed POIs while meeting driver distraction guidelines. Reasonable presentation of POIs includes withhold/filtering out POIs that cannot fit within time constraints of a current trip.

SUMMARY OF THE INVENTION

As approach to selecting/presenting places of interest (smart waypoints) is described herein. The described waypoint server system relies upon configuration of a variety of user interests/needs and trip requirements (particular routes and time schedules) to provide a limited, yet highly relevant, set of proposed POIs for consideration by vehicle occupants during operation of a vehicle on a configured trip.

In particular, the waypoint server system carries out a method for incorporating a new waypoint, based upon a proposed place of interest (POI), into a current trip defined in a waypoint server system for a vehicle. The method includes configuring, on the waypoint server system, a trip definition for the current trip. The trip definition includes a current trip route to a destination, an estimated time of arrival (ETA) at the destination, a desired time of arrival at the destination, and a delay factor indicating a degree to which the ETA can exceed the desired time of arrival.

The method furthermore includes determining, on the waypoint server system, a proposed POI for the trip definition based upon: the trip definition, and a collection of potential proposed POI instances. After determining the proposed POI, the method includes issuing, by the waypoint server system through a mobile wireless network link to an in-vehicle user device, the proposed POI for presentation to a vehicle occupant.

In accordance with the described method during the determining, the waypoint server system processes the collection of potential proposed POI instances, to render the proposed POI, by: (1) establishing POI ratings for individual ones of the collection of potential proposed POI instances, the POI rating for each individual POI of the collection of potential proposed POI instances being based at least in part upon: the delay factor, and an estimate of additional delay arising from adding the individual POI to the current trip route; (2) establishing a rank ordering of the individual ones of the collection of potential proposed POI instances based upon the POI ratings; and (3) rendering the proposed POI from the rank ordering of the individual ones of the collection of potential proposed POI instances.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

FIG. 3A is a summary of a set of fields contained in an exemplary record describing a particular identified vehicle;

FIG. 3B is a summary of a set of fields contained in an exemplary record describing a particular identified occupant;

FIG. 3C is a summary of a set of fields contained in an exemplary record describing a particular identified place of interest (POI);

FIG. 3D is a summary of a set of fields contained in an exemplary record describing a particular place of interest (POI) type (e.g. gas station);

FIG. 3E is a summary of a set of fields contained in an exemplary record describing a particular identified trip including one or more scheduled destination points;

FIG. 3F is a summary of a set of fields contained in an exemplary record describing a designated waypoint associated with a particular identified trip structure (see FIG. 3D);

DETAILED DESCRIPTION OF THE DRAWINGS

Figure 1:
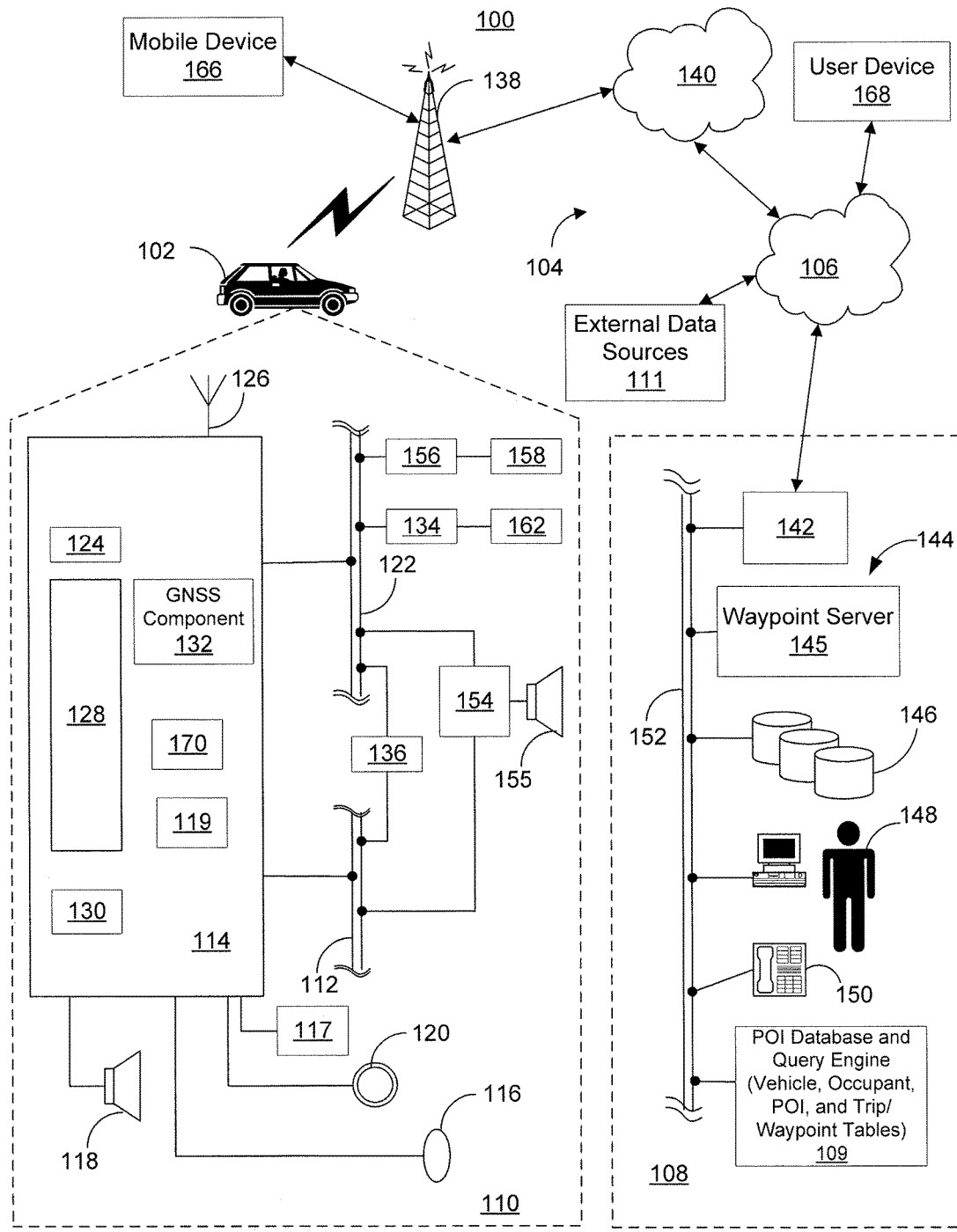
FIG. 1 is a schematic diagram of an operating environment for a mobile vehicle communication system usable in implementations of the described principles.

Before discussing the details of the invention and the environment wherein the invention can be used, a brief overview of an exemplary networked telematics/infotainment system is given to guide the reader. In general terms, not intended to limit the claims, the disclosure/invention is directed to a system and method for presenting a filtered and prioritized set of POIs. The POIs are prioritized/ranked based upon one or more rating values (for potentially multiple rating types—desirability, need, delay, etc.) assigned to POI instances. Ranked POIs are arranged/categorized/grouped in a variety of ways based upon current needs and interests. POIs are scored and ranked as individual POIs and/or as groups of POIs.

In the case of a rating value assigned to a group of POIs (a "cluster" or "super group"), a combined POI rating value is calculated for a group of POIs comprising at least one POI for a specified set of POI categories (e.g., gas, food, grocery, hotel, etc.) within a same general location (e.g. a same highway exit). The combined POI rating is, for example, computed by adding the individual rating value assigned to a highest POI instance taken from each of multiple categories at the same general location. Each of the multiple categories corresponds to a current potential/actual need of the vehicle and/or one or more vehicle occupant. Current needs may be expressly indicated by vehicle occupants or implied by monitored statuses (e.g., fuel level, time of day, distance/time since last rest/food stop, previous trips along a same route, etc.). By way of example, given the added computing load associated with generating POI groups, generating a POI group is triggered by a designation of a stopping location along a current trip route that, in turn, creates an initial locality and estimated time-of-arrival from which POIs for designated categories are rated/ranked and grouped. The designation of a stopping location along a current trip route may arise from selection of a single POI instance.

Offers and notifications relating to top rated/ranked POIs are presented to vehicle occupants in the form of messages presented on a human-machine audio-visual interface for a telematics/infotainment system. Messages presented to vehicle occupants corresponding to proposed POIs include, among other things, sponsor-based notifications (e.g. sales, special rates, rewards) relating to particular POIs seeking to induce drivers to add a particular POI as a waypoint in a currently designated trip. Such "sponsored" POI notifications can be presented based upon particular interests/needs attributed to a currently registered driver and/or occupant of a vehicle. The presence and degree of priority of sponsored POI notifications can be tailored by a registration/configuration session wherein a particular identified user indicates a set of particular interests, preferences, etc. The information provided during the registration session is thereafter supplemented by actual POI choices, an instantaneous POI type designation by an occupant (e.g. food, gas, lodging, park/rest area, etc.) indicating a current need of a vehicle occupant, and other learned behaviors/activities that can bear upon particular user preferences (e.g., regularly traversed routes and times of arrival at particular destinations such as place of work).

The filtering, prioritizing and presenting of the POIs is also based upon a stored trip configuration defining: (1) a destination, (2) a desired time of arrival (3) identified/registered vehicle occupants, (4) currently registered waypoints, (5) estimated time of arrival—which can include current road conditions that can introduce a delay due to congestion, construction and weather conditions, etc. In the case of traffic congestion, the system can increase a rating for particular POI to induce a user to schedule/re-schedule the particular POI as a new waypoint on a scheduled trip at a point prior to a currently observed traffic slowdown (based on real-time road sensor data available to the system) along a current route. The system presents POI notifications, including potentially sponsor-driven POI notifications, for selection by a vehicle occupant. The POI notifications are based upon the stored configuration and currently sensed conditions (e.g. current location, vehicle status, traffic status, etc.) affecting the ability of the driver to add a particular potential waypoint to a current trip while maintaining a desired/required schedule.

During filtering, the system identifies a subset of POIs from a set of all potential POIs based upon a configurable filtering criterion. The system assigns relative priority values to individual ones of the subset of POIs based upon a configurable weighting criterion. Calculating the subset of POIs and associated priority values is triggered by any one of an extensible set of triggering events including, for example, a new offer by a sponsored POI, a changed configuration parameter value and/or a changed status parameter value—including the passage of a period of time after a current subset has been designated and prioritized. Importantly, rather than presenting all potential POIs, the described system utilizes current information regarding a particular trip, including occupants' needs (e.g., POI modes designated by occupants), vehicle status, desired/targeted scheduled appointments, current road/weather conditions, etc. to prioritize/limit presented POIs and thereby meet driver distraction guidelines.

Upon sensing a selection of a presented individual proposed POI, by a user or by automated selection by POI selection logic in accordance with configured user preferences/historical behaviors, the system schedules/calculates an updated route, including estimated time(s) of arrival at designated points along a route to a specified destination—with the system taking into consideration an estimated time the trip will be temporarily suspended at the selected POI which has been incorporated as a new waypoint in the designated trip. Additionally, in the case of a sponsor-based POI notification, the system records the user's acceptance of the notification for additional processing. Such additional processing of a selected sponsor-based POI potentially includes recording: the identification/terms of the accepted POI offer, the time of acceptance, an identity of the accepting vehicle occupant. Additionally, regardless of whether a POI is sponsored, exemplary embodiments of the system attempt to retrieve user-specific ordering information relating to preparation of an order by the user relating to the selected POI (e.g., a pre-defined user-specific order and an estimated time of arrival based on current traffic conditions, payment amount/account information). The additionally gathered information is transmitted in the form of, for example, an instant message or email to the selected POI.

Additionally, selecting a presented individual proposed POI also triggers the system to invoke operation of POI rating and proposing modules to generate group POI ratings based upon a location of the selected POI and current indicated/inferred needs that may be fulfilled by other POI instances located near the selected POI (e.g. located at a same highway exit). Thus, selecting a restaurant at a particular highway exit along an extended road trip triggers generating a group POI including highest rated POIs for the following exemplary POI categories: a gas station, a store, a hotel, local attractions (e.g. a park, a museum), etc.

The system's use of filtering and weighting to present a reduced/ordered set of potential POIs substantially reduces the amount of attention required by a vehicle operator to review and select potential POIs and take appropriate responsive action to navigate the vehicle to a desired/needed waypoint along a route to a designated destination within a specified time frame (deadline). The system also provides a way to link, on a real time and location basis, POIs and potentially interested parties.

The system described herein addresses the seemingly inconsistent needs of presenting POIs and meeting distraction guidelines. However, the system provides information within guidelines by filtering, rating, prioritizing, and selectively presenting proposed POI information to vehicle occupants. Such POI information is formulated and presented in accordance with a variety of configured criteria, automatically sensed vehicle statuses (e.g. gas level, last stop (on a long trip), driver fatigue parameters, current location, designated next destination/time of arrival, vehicle occupants needs and interests, etc.).

In accordance with exemplary implementations, a scheduling engine utilizes designated destination arrival time to disqualify/filter out POIs that cannot be accommodated in a current trip due to an estimated time of arrival of the vehicle at the designated destination—which can be an intermediate destination or ultimate endpoint for a trip. The filtering and prioritization (including rating) criterion (including terms relating to sponsored POIs) applied to any given contemplated/in-progress trip can be tailored based on a variety of configurable trip descriptors including: the identified/registered vehicle occupants, previously visited waypoints, the fuel level, the number of miles to travel, the specified destination, target time of arrival (final and intermediate destinations), etc.

The system is also configured to prompt a user to enter and/or confirm (in the case of automatically generated waypoint selections added to a trip without previous presentation as a proposed POI) certain necessary/desirable waypoint types. Such waypoint types include: refuel/recharge stations (gas/electricity), food, rest (coffee/fresh air), attractions/entertainment venues, and lodging. Moreover, the set of types of waypoint prompts can be driven by the length of the trip, the vehicle occupants, the time of day, etc. The type of prompt can also be driven by currently sensed conditions. For example, a coffee prompt can occur in response to detecting driving patterns indicative of driver impairment (e.g. excessive weaving, eyelids lowering, head nodding, over-steering, etc.).

Thus, the system determines and sequentially presents, to a vehicle operator and/or occupants, a filtered and prioritized set of POI notifications that, given proper configuration, requires almost no driver attention beyond accepting a presented POI recommendation and then following navigation instructions according to an updated route that incorporates the accepted POI. The system utilizes up-to-date information to continuously monitor trip status, indicated user selections, user needs, etc. to continuously determine and present a highly restricted/exclusive set of rated proposed POIs based upon current trip configuration information associated with the particular vehicle and current occupants.

In a particular example, based upon user selections of particular POIs, the system breaks down a current trip route, defined by at least a current time/location and a final destination time/location, into a set of sections anchored by waypoints. Each waypoint is associated with a particular activity (e.g. eat, refuel, rest/sleep, entertaimnent, etc.), location, and time duration. Moreover, the system continuously/repeatedly incorporates information from a variety of sources including: traffic and weather reports, vehicle operation parameters, navigation system data (speed limits, road distances), advertised specials/deals, etc.

Thus, the system described herein includes a first component for presenting POIs and a second component that processes selected POIs. Among other things, the second (POI selection processing) component of the system breaks the overall trip into segments based upon a currently designated set of waypoints and associated durations associated with each waypoint. The potential POI presentation and selected POI processing components are both configured to support sponsored POI notifications that serve as inducements to vehicle drivers/occupants to add a particular POI as a waypoint on a current/contemplated trip. Both the first and second components are supported by a navigation component configured, in a known manner, to calculate estimated times of arrival based upon current driving conditions and to issue turn-by-turn instructions along a currently proposed route for a trip—including any currently designated waypoints. The first and second components are further supported by a configuration component comprising a set of user interfaces supporting defining data structures for: users (drivers and occupants), POIs, trips (origin/destination locations, required waypoints, time constraints, etc.).

An exemplary computing and network communications environment is described hereinafter. It will be appreciated that the described environment is an illustrative example, and does not imply any limitation regarding the use of other environments to practice the described system and method for presenting POIs and managing designated POIs as waypoints along a specified trip. With reference to FIG. 1 there is shown an example of a communication system 100 that can be used with the present method and system to pass information pertinent to carrying out the described system. The communication system 100 generally includes a vehicle 102, a mobile wireless network system 104, a land network 106 and a communications center 108. It should be appreciated that the general overall architecture, setup and operation of the various networked components of the communication system 100 are generally known in the art and will not be described herein. Rather, the disclosure herein will primarily focus upon the reconfiguration of the existing architecture of the communication system 100 to carry out the functionality of a waypoint management system described herein.

In accordance with an illustrative example, the communications center 108 includes a place of interest database and query engine (POI database and query engine) 109. The POI database and query engine 109 incorporates functional components configured to manage a plurality of tables containing records including fields defining/describing POIs, vehicles, vehicle occupants (drivers/passengers), roads, specified trips, etc. A substantial portion of the content stored within the tables of the POI database and query engine 109 originates from a set of external data sources 111 (described herein below with reference to FIG. 2). The content and use of various table data records, including a variety of configurable settings relating to identified vehicle users/occupants and defined trips, are described in substantial detail herein below. Thus, the POI database and query engine 109 maintains a multitude of tables and associated record types describing current status information as well as historical information upon which a variety of POI/waypoint-related search criteria are applied to render POIs and other information pertinent to POI presentation and waypoint processing functionality described herein. Additionally, a variety of trigger types are contemplated. Such triggers are based upon a variety of monitoring and waypoint management operations applied to the configured contents and status information stored by the POI database and query engine 109.

The vehicle 102 is, for example, a motorcycle, a car, a truck, a recreational vehicle (RV), etc. The vehicle 102 is equipped with suitable hardware and software that configures/adapts the vehicle 102 to facilitate communications with the communications center 108 via mobile wireless communications. The vehicle 102 includes hardware 110 such as, for example, a telematics unit 114, a microphone 116, a speaker 118, a graphical display device 117 including touchscreen interface functionality, and buttons and/or controls 120 integrated with the telematics unit 114. In a warning mode of operation of the telematics unit 114, the speaker 118 is used, for example, to issue an audible warning/alert to a user when a notification is received from the communications center 108, via the communications system 100, regarding any particular aspect of a currently registered waypoint or potential POI along a current trip. Such use of a speaker to issue notifications can potentially reduce the need for a driver to view a display to obtain warnings/alerts relating to actual/potential waypoints on a current trip.

The telematics unit 114 is further configured to include a vehicle occupant determination module 119. The vehicle occupant determination module 119 incorporates functionality for receiving a signal indicative of a current vehicle occupant. Such signal can be provided via manual user input via the graphical/touchscreen interface of the graphical display device 117. Alternatively, such information can be acquired without manual user input via, for example, a sensor of a set of vehicle sensors 162 coupled to the telematics unit 114 via corresponding ones of a set of sensor interface modules 134. The information identifying occupants, regardless of the mode of acquisition, is provided to the vehicle occupant determination module 119. In the case of using the sensor of the set of sensors 162 to identify vehicle occupants, radio frequency identification (RFID) technologies or other electronic signals are received by the sensor via short-range communications (e.g., BLUETOOTH) with a device (e.g. a smart phone) possessed by potential vehicle occupants. The received information is thereafter forwarded by one of the set of sensor interface modules 134 to the vehicle occupant determination module 119. Such occupant information is utilized by the system described herein to select from a variety of potential configurations of the POI recommendation and/or stored trip information maintained by the system either locally in the memory 130 or, alternatively, in the POI database and query engine 109. Storing configurations in the POI database and query engine 109 ensures that telematics unit 114 can readily acquire configuration information relating to an identified vehicle occupant that may not have previously occupied the vehicle 102. Such scenarios arise, for example, in the context of ride sharing and vehicle rentals. In such instances, the newly identified occupants are identified via the vehicle occupant determination module 119 which is configured to invoke download requests issued by the telematics unit 114 to the POI database and query engine 109 to obtain configuration information relating to the identified occupants for purposes of determining a current trip and/or configured characteristics (including preferences) of the occupants for purposes of tailoring proposed POIs that can be selected and added as waypoints for a current trip.

The telematics unit 114 is communicatively coupled, via a hard wire connection and/or a wireless connection, to a vehicle bus 122 for supporting communications between electronic components within the vehicle 102. Examples of suitable network technologies for implementing the vehicle bus 122 in-vehicle network include a controller area network (CAN), a media oriented system transfer (MOST), a local interconnection network (LIN), an Ethernet, and other appropriate connections such as those that conform with known ISO, SAE, and IEEE standards and specifications.

The telematics unit 114 is a highly configurable/programmable on-board electronic device providing a variety of services through execution of configured program instructions and communications with networked system components including, for example, the communications center 108. The telematics unit 114 includes an electronic processor 128, electronic memory 130, a mobile wireless component 124 including a mobile wireless chipset, a dual function antenna 126 (both GNSS and mobile wireless signal), and a GNSS component 132 including a GNSS chipset. In one example, the mobile wireless component 124 comprises an electronic memory storing a computer program and/or set of computer-executable instruction sets/routines that are transferred to, and executed by, the processing device 128. The mobile wireless component 124 constitutes a network access device (NAD) component of the telematics unit 114.

The telematics unit 114 provides, for users, an extensive/extensible set of services. Examples of such services include: GNSS-based mapping/location identification, turnby-turn directions and other navigation-related services provided in conjunction with the GNSS component 132; and airbag deployment notification and other emergency or roadside assistance-related services provided in connection with various crash and or collision sensor interface modules 156 and crash sensors 158 located throughout the vehicle. The telematics unit 114 also supports receiving and forwarding to the POI database and query engine 109 and a waypoint server 145 (described herein below), via the mobile wireless component 124, a variety of sensor readings relating to operation of the vehicle 102 that can impact the set of POIs presented to vehicle occupants and/or trigger decision-making logic on the waypoint server 145 relating to a trip.

The telematics unit 114 further includes a short-range wireless unit 170 capable of communicating with a user's mobile device such as a cellular phone, tablet computer, PDA, or the like, over a short-range wireless protocol. For example, in one implementation, the short-range wireless unit 170 is a Bluetooth unit with an RF transceiver that communicates with a vehicle occupant's mobile wireless communications device using Bluetooth protocol. It will be appreciated that other short-range wireless communication technologies other than Bluetooth are used in other implementations. The information provided by the mobile wireless device of a vehicle 102 occupant, to the telematics unit, via the short-range wireless unit 170 is passed to, for example, the POI database and query engine 109 configured to maintain a searchable storehouse of information relating to POIs and registered occupant configuration information.

GNSS navigation services are, for example, implemented based on the geographic position information of the vehicle provided by the GNSS component 132. A user of the telematics unit 114 enters a destination, for example, using inputs associated with the GNSS component 132, and a route to a destination can be calculated based on the destination address and a current position of the vehicle determined at approximately the time of route calculation. Turn-by-turn (TBT) directions can be presented by the graphical display device 117 screen and/or through vocal directions provided through a vehicle audio component 154. It will be appreciated that the calculation-related processing can occur at the telematics unit 114 or can occur at the communications center 108.

The telematics unit 114 supports infotainment-related services whereby music, Web pages, movies, television programs, video games and/or other content is downloaded by an infotainment center 136 operatively connected to the telematics unit 114 via the vehicle bus 122 and an audio bus 112. In one example, downloaded content is stored for current or later playback on the memory 130.

The above-listed services are by no means an exhaustive list of the current and potential capabilities of the telematics unit 114, as should be appreciated by those skilled in the art. The above examples are merely a small subset of the services that the telematics unit 114 is capable of offering to users. Moreover, the telematics unit 114 includes a number of known components in addition to those listed above that have been excluded since they are not necessary to understanding the functionality discussed herein below.

The telematics unit 114 uses radio transmissions to establish communications channels with the mobile wireless network system 104 so that voice and/or data signals, including ones containing data corresponding to one or more vehicle occupants and information relating to waypoints along a current trip, can be sent and received via the communications channels. The mobile wireless component 124 enables both voice and data communications via the mobile wireless network system 104. The mobile wireless component 124 applies encoding and/or modulation functions to convert voice and/or digital data into a signal transmitted via the dual function antenna 126. Any suitable encoding or modulation technique that provides an acceptable data rate and bit error can be used. The dual function antenna 126 handles signals for both the mobile wireless component 124 and the GNSS component 132.

The microphone 116 provides the driver or other vehicle occupant with an interface for inputting verbal or other auditory commands to the telematics unit 114, and can be equipped with an embedded voice processing unit utilizing a human/machine interface (HMI) technology known in the art. The speaker 118 provides verbal output to the vehicle occupants and can be either a stand-alone speaker specifically dedicated for use with the telematics unit 114 or can be part of the audio component 154. In either case, the microphone 116 and the speaker 118 enable the hardware 110 and the communications center 108 to communicate with occupants of the vehicle 102 through audible speech.

The hardware 110 also includes the buttons and/or controls 120 for enabling a vehicle occupant to activate or engage one or more components of the hardware 110 within the vehicle 102. For example, one of the buttons and/or controls 120 can be an electronic push button used to initiate voice communication with the communications center 108 (whether it be live advisors 148 or an automated call response system). In another example, one of the buttons and/or controls 120 initiates/activates emergency services supported/facilitated by the telematics unit 114.

The audio component 154 is operatively connected to the vehicle bus 122 and the audio bus 112. The audio component 154 receives analog information via the audio bus, and renders the received analog information as sound. The audio component 154 receives digital information via the vehicle bus 122. The audio component 154 provides AM and FM radio, CD, DVD, and multimedia functionality independent of the infotainment center 136. The audio component 154 can contain a speaker system 155, or can utilize the speaker 118 via arbitration on the vehicle bus 122 and/or the audio bus 112.

The vehicle crash and/or collision detection sensor interface 156 is operatively connected to the vehicle bus 122. The crash sensors 158 provide information to the telematics unit 114 via the crash and/or collision detection sensor interface 156 regarding the severity of a vehicle collision, such as the angle of impact and the amount of force sustained.

The set of vehicle sensors 162 are connected to corresponding ones of the set of sensor interface modules 134 operatively connected to the vehicle bus 122. In addition to the short-range wireless sensor specifically mentioned above, examples of the set of vehicle sensors 162 include gyroscopes, accelerometers, magnetometers, emission detection and/or control sensors, fuel level sensors, coolant temperature sensors, etc. Examples of the sensor interface modules 134 include ones for power train control, climate control, and body control. Data from the sensor interface modules 134 is provided to automobile electronic control units, including an engine control unit (ECU), not shown in FIG. 1.

Furthermore, in accordance with an illustrative example, vehicle occupant and trip event data are provided by the sensor interface modules 134 (either directly via the vehicle bus 122 or indirectly via the ECU) to the telematics unit 114. By way of example, the telematics unit 114 selectively processes and forwards data values acquired via the set of vehicle sensors 162, in accordance with a configured signal data acquisition/filtering scheme, to the POI database and query engine 109 (via the waypoint server 145). The forwarded data values are received by, for example, the waypoint server 145 in a waypoint system operational/status message. The waypoint server 145 thereafter extracts the data from the message and submits the received values via database request messages to the POI database and query engine 109. Examples of the types of information maintained in the records of tables of the POI database and query engine 109 are described herein below with reference to FIGS. 3A-3F.

The mobile wireless network system 104 is, for example, a cellular telephone network system or any other suitable mobile wireless system that transmits signals between mobile wireless devices, such as the telematics unit 114 of the vehicle 102, and land networks, such as the land network 106. In the illustrative example, the mobile wireless network system 104 includes a set of cell towers 138, as well as base stations and/or mobile switching centers (MSCs) 140, as well as other networking components facilitating/supporting communications between the mobile wireless network system 104 and the land network 106.

As appreciated by those skilled in the art, the mobile wireless network system 104 includes various cell tower/base station/MSC arrangements. For example, a base station and a cell tower could be co-located at the same site or they could be remotely located, and a single base station could be coupled to various cell towers or various base stations could be coupled with a single MSC, to name but a few of the possible arrangements.

Land network 106 can be, for example, a conventional land-based telecommunications network connected to one or more landline end node devices (e.g., telephones) and connects the mobile wireless network system 104 to the communications center 108. For example, land network 106 includes a public switched telephone network (PSTN) and/or an Internet protocol (IP) network, as is appreciated by those skilled in the art. Of course, one or more segments of the land network 106 can be implemented in the form of a standard wired network, a fiber or other optical network, a cable network, other wireless networks such as wireless local networks (WLANs) or networks providing broadband wireless access (BWA), or any combination thereof.

The communications center 108 is configured to provide a variety of back-end services and application functionality to the hardware 110. The communications center 108 includes, by way of example, network switches 142, servers 144 (including the waypoint server 145), databases 146, live advisors 148, as well as a variety of other telecommunications equipment 150 (including modems) and computer/communications equipment known to those skilled in the art. These various call center components are, for example, coupled to one another via a network link 152 (e.g., a physical local area network bus and/or a wireless local network, etc.). Switch 142, which can be a private branch exchange (PBX) switch, routes incoming signals so that voice transmissions are, in general, sent to either the live advisors 148 or an automated response system, and data transmissions are passed on to a modem or other component of the telecommunications equipment 150 for processing (e.g., demodulation and further signal processing).

The servers 144, as noted above, include the waypoint server 145. By way of example, the waypoint station server 145 is configured with an Internet interface facilitating providing waypoint management services to a variety of identified user/subscribers and associated configured trips.

In an exemplary scenario, identified users of the telematics unit 114 specify/configure a proposed POI and warning/alert notification scheme wherein the waypoint station server 145 queries the POI database and query engine 109 for pertinent POI and trip status information, and forwards alerts to the telematics unit 114 notifying the current occupants of particular POIs that have been determined to be both desirable and within constraints of a specified trip (including both route and time constraints). The automated nature of the notification/alert message issuance procedure is dependent upon the telematics unit 114 to acquire and forward pertinent information relating to the current vehicle status (e.g., location, traffic congestion, need for gas/food/rest, etc.) to the waypoint server 145 in accordance with a management role of the waypoint server 145 with regard to proposing and thereafter registering waypoints for defined trips characterized by a vehicle including particular occupants having a specified trip route and specified departure/arrival times at particular locations along a the specified trip route.

To that end, the waypoint server 145 is also configured with a database query interface (e.g., an internal network interface module 205 in FIG. 2) facilitating submitting structured queries to the POI database and query engine 109 and receiving/processing subsequent responsive data. In general, the waypoint server 145 also responds to requests from users (via the telematics unit 114 or other networked systems), acquires relevant data from the tables maintained by the POI database and query engine 109, applies specified instruction/alert/warning criteria to the acquired data, and renders responsive instructions/alerts/warnings to the requesting users with regard to identified trips. The functionality of the waypoint server 145, including exemplary status detection/reporting modules configured to perform a variety of supporting operations, are described, by way of example herein below, with reference to FIG. 2.

The telecommunications equipment 150 includes, for example, an encoder, and can be communicatively connected to various devices such as the servers 144 and the databases 146. For example, the databases 146 comprise computer hardware and stored programs configured to store subscriber profile records and other pertinent subscriber information. Although the illustrated example has been described as it would be used in conjunction with a manned version of the communications center 108, it will be appreciated that the communications center 108 can be any of a variety of suitable central or remote facilities, which are manned/unmanned and mobile/fixed facilities, to or from which it is desirable to exchange voice and data.

It will be appreciated by those of skill in the art that the execution of the various machine-implemented processes and steps described herein can occur via the computerized execution of computer-executable instructions stored on a tangible computer-readable medium, e.g., RAM, ROM, PROM, volatile, nonvolatile, or other electronic memory mechanism. Thus, for example, the operations performed by the telematics unit can be carried out according to stored instructions or applications installed on the telematics unit, and operations performed at the call center can be carried out according to stored instructions or applications installed at the call center.

The POI database and query engine 109 maintains information pertaining to: vehicles, a plurality of occupants, POIs, and associated events of trips of the identified occupants. In a particular highly automated example, each time the vehicle 102 is used to take a trip, the set of vehicle sensors 162, through the sensor interface module 134 and operatively connected to the vehicle bus 122, determine vehicle occupants and provide such information to the vehicle occupant module 119. Upon determining that a particular occupant has entered a vehicle, the telematics unit 114 receives and monitors information pertaining to the occupant and trip. For example, through the set of vehicle sensors 162 and sensor interface modules 134, the telematics unit 114 can determine the times at which a waypoint-related stop begins and ends. The telematics unit 114 can furthermore determine when a particular occupant enters/leaves a vehicle to establish occupant-specific trip histories. In this way, user-specific histories, and associated preferences, can be established by recording particular POIs selected as waypoints when a particular identified individual takes a trip along a particular route, and other acquired information relating to the waypoints (e.g. a rating of food quality/service at a particular restaurant). Such detailed information is incorporated into the decision-making performed by the waypoint server when recommending future POIs as potential waypoints along particular trips.

The information provided in association with a particular identified occupant and trip (or a particular waypoint within the trip) can be used in a variety of ways. For example, the name of a particular restaurant/coffee chain associated with a waypoint actually visited by the identified occupant can be used to determine a degree of affinity between the particular identified vehicle occupant and the identified POI (or type of POI) for use by the waypoint server 145 at a later time when determining a set of proposed POIs for a trip in a vehicle containing the identified occupant.

Configuration of trips and identified occupants need not be performed solely through the telematics unit 114. Instead, a registered vehicle occupant utilizes a mobile wireless device 166 (e.g. a smart phone) or a user device 168 having a land network connection (e.g. a networked home computer such as a tablet, desktop or notebook computer) to access account information (e.g., trip histories and configuration information for the particular identified occupant) via a Web site supported by the waypoint server 145. Such access of account information includes view and editing (including deleting) trip histories, POI visits, preference configurations, etc. that are stored upon the POI database and query engine 109.

Figure 2:
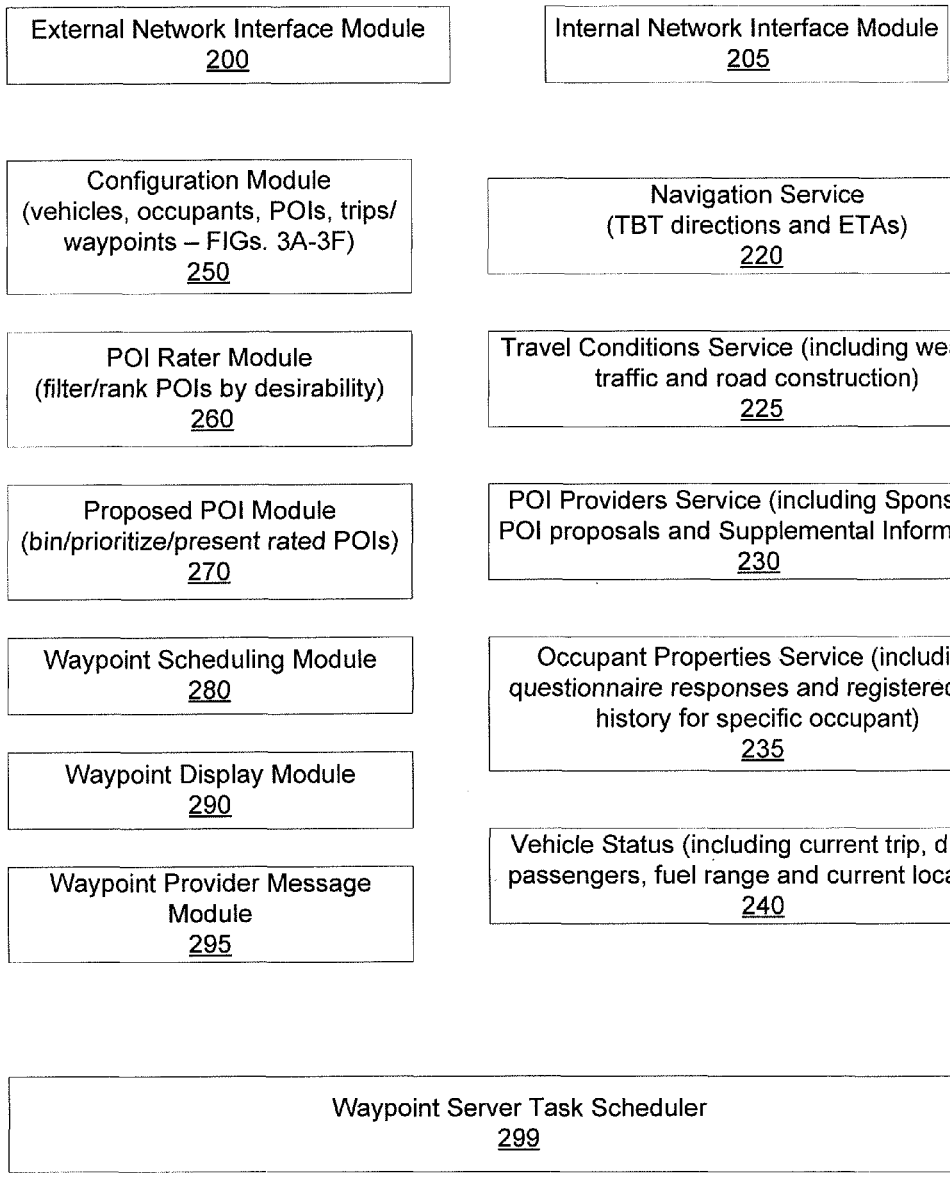
FIG. 2 is a schematic diagram of an exemplary server comprising a set of modules for carrying out a varieties of functions supporting the waypoint suggestion/management functionality described herein.

FIG. 2 provides an illustrative schematic diagram of an exemplary system architecture for carrying out the functionality of the waypoint server 145, in conjunction with the POI database and query engine 109, managing proposed POI filtering, rating, prioritizing, and presenting; and subsequent incorporation of selected POIs as waypoints of a specified trip for the vehicle 102 containing an identified vehicle occupant. The waypoint server 145 comprises programmed computer hardware including a processor, physical electronic communications interfaces, a non-transitory computer-readable medium including computer-executable instructions (executed by the processor) and data structures. The components of the programmed computer hardware operate, in combination, to carry out the functions of the modules of the waypoint server 145 identified in FIG. 2 and described herein below. The various identified components/modules of the waypoint server 145 depicted in FIG. 2, comprise computer-executable instructions stored on a non-transitory computer readable medium that are executed by a processor of the waypoint server 145 to facilitate carrying out the functionality of the described component/module.

The waypoint server 145 includes an external network interface module 200 supporting communications between the waypoint server 145 and a variety of data sources/sinks such as the telematics unit 114, the mobile device 166 and the user device 168. By way of example, the external network interface module 200 supports file delivery functionality corresponding to downloadable web pages and data message exchange functionality relating to various types of data (described herein below) passed between the telematics unit 114 and the waypoint server 145 to facilitate management of trips containing one or more scheduled waypoints. The scheduled waypoints correspond, for example, to selections by vehicle occupants from a set of proposed POIs forwarded by the waypoint server 145 to vehicle occupants via, for example, the telematics unit 114 (or alternatively/additionally the mobile device 166 and/or the user device 168).

The external network interface module 200 also supports requests by the waypoint server 145 for various types of information aggregated and provided by a set of external information services. The information provided by the set of external information services includes information relating to management of waypoints for identified vehicles and identified occupants. For example, the waypoint server 145 includes a navigation service that is configured to request/receive navigation information from a navigation data source. By way of example, the navigation service 220 requests/receives: (1) turn-by-turn (TBT) instructions between specified endpoints of a trip (or segment thereof), (2) estimated time(s) of arrival at the one or more destination points specified for a trip or segment thereof, and (3) miscellaneous time computations such as estimated wait times for service stations, restaurants, etc. pertinent to building in non-driving periods in trip time computations.

The waypoint server 145 includes a travel conditions service 225 that is configured to acquire/receive travel condition information, via the external network interface module 200. The travel conditions service 225 provides a variety of information relevant to calculating travel-related delays, along a specified trip or segment thereof, based upon currently observed: weather, traffic congestion, and road construction. More particularly, the travel conditions service 225 provides weather conditions and predictions provided by weather services. The travel conditions service 225 can also provide real-time traffic congestion information indicating actual vehicle speeds instead of the posted speed limits. Similarly, the road construction information can be used to indicate potential bottle necks and other physical obstacles that may tend to slow down traffic on particular identified roads.

The waypoint server 145 also includes a POI providers list service 230 that is configured to acquire/receive POI properties information, via the external network interface module 200. The POI providers list service 230 aggregates and organizes a variety of information relating to potential POIs including, for example, descriptions of identified POIs and associated popularity and ratings. The POI descriptions include generic POI information (across all types of POIs) such as a POI name, unique identification and location. Such basic information is potentially augmented by a variety of supplemental information that may significantly influence whether a particular POI proposal is accepted by an occupant to whom the proposal is presented. Such supplemental information includes: hours of service, menu, prices (e.g. gas price, room rate, etc.), special offers, ratings (professional, social media, etc.), estimated wait time (if the POI is a restaurant, café, etc.) at time of arrival, menu, etc. The content provided by the POI providers list service 230 can be extracted/aggregated from on-line sources including: ZAGAT, Rick Steves, Yelp, FourSquare/Swarm, Facebook, Groupon, Instagram, Vine, Lonely Planet, previous user Internet searches, etc. The waypoint server 145 stores the POI information, acquired by the POI providers list service 230, in the POI database and query engine 109. As such, the POI providers list service 230 ensures the availability of up-to-date potential proposed POIs for consideration by the waypoint server 145 when a need arises for a set of proposed POIs for an identified trip (described herein below with reference to FIG. 4).

The waypoint server 145 includes an occupant properties service 235 that is configured to access/receive, via the external network interface module 200, a variety of previously configured/stored occupant properties (including preferences). Such configured/stored occupant properties include: (1) information acquired from registered responses to occupant questionnaires, and (2) preferences implied from recent/actual visits to POIs stored in a historical event table. Such occupant-specific properties include: occupant name, unique identification, password, contact information, age, gender, children (links to child/occupant descriptions), spouse (link to spouse/occupant description), favored services/goods providers (user stated) for particular types of service/goods classes (e.g. refueling/recharging, food, entertainment, lodging, etc.), loyalty program memberships, favorite foods, work/school schedule, previous POI visits (name, identification, location and timestamps associated with each visit to particular POI)—including indication/distinction of relatively recent multiple visits to a POI, live occupant status information (drowsiness, low blood sugar, etc.), account information (e.g. credit card number for on-line pre-payment of requested goods/services at a selected POI), driver behaviors (frequent rests, daytime driver only, drive-through/sit down meals), route preferences (highway/local roads), and personality traits (spontaneity, adventurous, risk taker, type-A/B, promptness/timeliness, etc.).

The occupant properties information is acquired from a variety of internal/external sources. By way of example, the occupant properties service 235 obtains the information in advance from the sources and stores the information in the POI database and query engine 109 prior to use by decision logic relating to presentation of POIs to identified vehicle occupants by the waypoint server 145. Alternatively, the above-identified information is obtained on demand and provided directly by the occupant properties service 235 without storing the information in occupant tables maintained by the POI database and query engine 109.

The waypoint server 145 includes a vehicle status service 240 that is configured to access/receive, via the external network interface module 200, a variety of vehicle status information including: a currently designated trip (including current waypoints and associated locations/ETAs), type of trip (pleasure/vacation, business, appointment(s)/event(s) at destination(s)), current location, driver identity, passenger(s) identity, fuel range, last stop information (time, location, purpose (implied/express), time since last rest stop (duration lasting at least a configured rest time period—e.g. 30 minutes), estimated remaining fuel range (fuel economy value*remaining fuel value), and vehicle maintenance parameter values (oil temperature/pressure, coolant temperature, etc.). The waypoint server 145 uses the vehicle status information to determine current levels of need ("need ratings") for the vehicle/occupants with regard to particular categories of POIs.

The vehicle status service 240 acquires the vehicle status information from a variety of internal/external sources. By way of example, the vehicle status service 240 obtains the information from various sources and stores the information in the POI database and query engine 109 prior to use by decision logic within various executable modules (described herein) of the waypoint server 145. Alternatively, the above-identified information is obtained on demand and provided directly by the vehicle status service 240 without storing the information in vehicle table records maintained by the POI database and query engine 109.

Additionally, the waypoint server 145 includes the internal network interface module 205. The internal network interface module 205 is configured to support a database command interface between the waypoint server 145 and the POI database and query engine 109. The internal network interface module 205 is configured to formulate commands for storing particular record information in particular tables (e.g. configuration and status information described herein below) and to retrieve such information from the POI database and query engine 109. The retrieved information is applied to waypoint management logic executed by the waypoint server 145 to render proposed POIs and various alerts/warnings relating to currently defined trips including previously selected POIs as waypoints along a route specified in the defined trip.

With continued reference to FIG. 2, a configuration module 250 is configured with computer-executable instructions for presenting, to identified users (e.g. vehicle occupants) via browsers, Web pages and associated messaging for populating the POI database and query engine 109 with a variety of configuration information relating to and describing/defining properties of: vehicles, registered occupants, POIs and trips—including scheduled waypoints along routes of specified trips. The configuration module 250 includes, for example, a file server and defined configuration files defining a waypoint management Web site functionality supporting/defining a set of Web pages facilitating input of descriptions of: vehicles; vehicle occupants (both driver and passenger)—including both preferences (likes/dislikes) and event histories (representing actually visited POIs, purchased foods/beverages/goods/services); POIs; and trips—including specified waypoints defined by locations, time/duration, and purpose.

The various tables/records of the POI database and query engine 109 that are configured via the configuration module 250 are described herein below with reference to FIGS. 3A-3F.

Turning to FIG. 3A, vehicle records can be configured, for example, by specifying: identification 300 (e.g. unique vehicle name), primary occupant/default driver 302, secondary/additional drivers 304, primary/secondary passenger(s) 305, fuel capacity 306, highway fuel economy and city fuel economy 308, vehicle-to-vehicle communications capabilities 310, vehicle-to-travel information data source communications capabilities 312, and repeating/frequent/favorite trips 314 (including associated time/days/date) identified by name of trip stored in trip table of database 109.

Turning to FIG. 3B, vehicle occupant records can be configured, for example, by specifying: identification 320 (e.g. unique occupant name), authentication information 322 (e.g. password), age 324, gender 326, weight 328 (for automatic sensing in seat), loyalty program memberships/identifications 330, electronic payment source 332 (e.g., credit card account), Personalized POIs 334 ranked/rated and categorized by waypoint purpose (e.g. refuel, meal, rest, hotel, health issues, entertainment, etc.), POI proposal preferences 336 (e.g., type limitations, frequency limitations, rating threshold—ensure only highly relevant/desirable/necessary POI proposals permitted, sponsored offer sources, etc.), previously accepted proposed POIs/offers 338, blocked POIs 340, and driving characteristics 342 (need for frequent stops, daytime driving only, etc.). The occupant record structure depicted in FIG. 3B also includes a POI rating threshold/proposal frequency 344 that indicates a level of restriction to disturbances created by the presentation of proposed POIs. By way of example, the POI rating threshold/proposal frequency 344 specifies a minimum POI rating for filtering out potential POIs that do not meet a threshold level of desirability for a vehicle occupant and/or a limitation on how often POIs are proposed (e.g. one proposal every 10 minutes, every 20 minutes). The threshold/frequency values are specified on a category basis and/or trip type basis. A registered occupant, which can be a driver or passenger, after performing an initial registration procedure via the configuration module 250, is allocated a corresponding, uniquely identified record within an occupant table maintained on the POI database and query engine 109. Additionally, POIs identified in the occupant records include a reference (e.g., unique identification) to a POI record in the POI database and query engine 109. By way of example, a liked/disliked proposed POI container 346 maintains a listing of proposed POIs for which an identified occupant selected a like/dislike button (as well as which option was selected by the identified occupant). A recorded like/dislike button choice for a proposed POI can potentially have a significant effect upon whether a potential proposed POI will be considered for presentation to a particular vehicle occupant. A "liked" proposed POI for a particular category/location combination will be favored over a similarly desirable/rated alternative proposed POI that is neutral or disliked.

Turning to FIG. 3C, POI records can be configured, for example, by specifying: a POI identification 350 (e.g. unique POI name) including unique site identification (e.g. site number), a uniqueness score 351, authentication information 352 (for editing/changing a POI record), POI type/classification 354, location 356 (e.g., GNSS coordinates), hours of availability/service 358, available capacity 360 (recharging outlets/stations), amenities 362 (e.g. Wi-Fi access), menu 364—including costs, ratings 366 (links), special offers 368, loyalty/rewards programs 370, sponsor agreement terms 372 (including host system compensation rate/reward), estimated time duration for visit 374 (drive-through/sit down), contact information 376 (email, web-page electronic ordering, phone number) for placing reservation/order. A registered POI, after performing an initial registration procedure via the configuration module 250, is allocated a corresponding, uniquely identified record within a POI table maintained on the POI database and query engine 109. The uniqueness score 351 is assigned based upon a global relative uniqueness of the particular POI instance. For example, a restaurant chain outlet is assigned a low uniqueness score based upon the existence of hundreds of instances of very similar POI instances. On the other hand a particular museum or amusement park is assigned a relatively high uniqueness score. Uniqueness scores are, for example, weighted differently based upon a type of trip (e.g. family road trip, daily commute, etc.). Moreover, based upon the type of trip (e.g. a cross-country road trip), the uniqueness can potentially play a significant role in the determination of an overall rating for a highly unique POI. For example, during a trip, the uniqueness score 151 is used as a multiplication factor that can vault an otherwise lower rated POI (e.g. a due to a delay introduced by a resulting added waypoint) into a much higher ranking.

Turning to FIG. 3D, POI type records can be configured, for example, by specifying a POI type identification 380 and a POI type name (a text description of the particular POI type, such as gas station, coffee shop, rest stop, etc.). Because POI ratings (as will be explained further below) can be "need" based, a POI type rating formula 384 specifies a formula for specifying a POI type "need" component value (stored in a POI type rating value 386).

A POI instance rating formula 388 for the particular POI type specifies a formula that renders a POI rating value for assignment to particular POI instances of the POI type (e.g., instances of a "gas station" POI type). In a particular example, the POI instance rating formula 388 renders an overall POI rating value for instances of the particular POI type by combining the POI type rating value 386 with additional rating component values arising from, for example, various sources including: driver/occupant preferences, promotions, destination/subsequent waypoint arrival time impact on the currently configured trip record (see FIG. 3E below). The formula 388 may specify a weighted sum of the above-noted rating data source components. However, in alternative embodiments, rather than use the POI instance rating formula 388, each POI instance has a multi-variable rating descriptor where each rating variable (e.g., need, desirability, time delay, promotion, cost, etc.) is assigned a value. Thereafter, instead of generating a ranking based upon single, overall rating values assigned to individual candidate POIs, the POI instances are ranked by performing a multi-tier sort based upon primary, secondary, etc. sort keys (resolving ties) on the contents of the multi-variable rating descriptors for the POI instances.

Turning to FIG. 3E, trip records—including specified waypoints—can be configured, for example, by specifying: trip identification 400, trip origin 401, start time/day/date 402, trip destination 404, a destination type 405 (relative/friend, business, dinner, overnight stay—the destination type can be: (1) configured/assumed based upon prior history of the particular destination and (2) used to disqualify certain types of POIs (e.g. food if the destination is a known meal destination)), final destination time/day/date 406, unique trip name 408, current route 409, current route ETA 410 (i.e., the ETA based upon the currently designated route and waypoints), current driver identification 411, current passenger(s) identification(s) 412, vehicle_ID 413 (see FIG. 3A), trip scheduling/frequency 414 (repeating, weekday daily, weekly—including day of week, etc.), driving restrictions 416 (e.g. daytime driving only, no highways, no toll ways, etc.), designated waypoints 418 (see FIG. 3F), delay factors 420 (a delay factor threshold that is an indicator of relative flexibility for arriving later than a specified arrival time at the trip destination and/or an intermediate scheduled waypoint), type of trip 422 (business, road trip, attend event at destination—also referred to as "trip mode"), a rating threshold/POI proposal frequency 424, and proposed POIs 426 (rendered by the proposed POI module 270).

By way of example, the proposed POIs 426 for a particular trip are presented as a multi-category set of lists, representing a ranked listing of "pending" proposed POIs that have not yet been presented to vehicle occupants. Within a category, proposed POIs are ordered, for example, by rating. Additionally, grouped POIs are present in the proposed POIs 426. In the case of grouped POIs, each grouped set of POIs is ranked based upon the order in which the locality represented by the grouped set of POIs is encountered along the current trip route.

By way of example, the value for the rating threshold/POI proposal frequency 424 for a vehicle is an overall value calculated from one or more individual rating thresholds/frequencies of current/specified vehicle occupants—see POI rating threshold/proposal frequency 344). The value(s) for the threshold/POI proposal frequency 424 are, by way of example, adjusted/specified based upon the type of trip (trip mode) specified in the type of trip 422. Additionally, the value(s) for the threshold/POI proposal frequency 424 are specified on a category (restaurant, coffee shop, gasoline) basis. The type of trip 422 is configurable by a user and/or generated by inference by the system (e.g. a commute to work, soccer practice, etc.) based upon trip history for the vehicle and/or current occupant(s).

The delay factors 420 are used by, for example, a POI Rater module 260 to determine a delay severity value based upon, for example, an estimated delay introduced by a potential POI. The delay factors 420 include, for example, a characterizing equation that produces a fractional value that is applied to reduce a POI rating for a potential POI by an increasing amount as delay increases. The delay factors 420 additionally include a maximum delay permitted value. The maximum delay permitted value is used by the POI Rater module 260 to disqualify a potential POI if the resulting added waypoint results in an unacceptably late arrival at the final destination of the trip. Additionally, the maximum delay permitted for a trip may take into consideration a currently defined waypoint having a time of arrival requirement (e.g. a reservation) that essentially defines a "sub-trip" within an overall trip. In that case, multiple position-linked maximum delay values are maintained in the delay factors 420 to account for timeliness requirements of waypoints prior to the trip final destination.

By way of example, the delay factor 420 is expressed as a time duration (e.g. 30 minutes) indicating that the estimated time of arrival may exceed the desired time of arrival by up to 30 minutes without being disqualified from consideration. Alternatively/additionally, the delay factor is a "multiplication factor" that starts, for example, at one and decreases at a specified rate (e.g. 0.1 per 30 minute added delay). The delay factor 420, expressed as a multiplication factor, is applied to (e.g. by multiplying) an initial rating for a potential proposed POI to render a delay adjusted rating for the POI. A variety of ways to adjust ratings or disqualify potential proposed POIs based upon the delay factor 420 are contemplated. The general purpose of the delay factor 420 is to specify a degree to which an expected delay will impact the suitability of potential proposed POIs for the configured trip. Thereby providing a reliable source of guidance for disqualifying/derating potential proposed POIs that, if added to a trip, introduce an unacceptable delay.

Thus, the delay factors 420 that are applied to a potential POI can be expressed/determined in a variety of ways using a variety of factor types/value ranges, including specifying: a value between zero and 10 representing delay (in)flexibility, a maximum delay period expressed as a time period or a percentage of the estimated trip duration, a multi-factor combination of the delay flexibility and an acceptable/unacceptable delay period value.

By way of example, the type of trip 422 is used to set a default value for the delay factors 420 that indicate a level of flexibility to delay arrival at the final destination or any intermediate waypoint. Thus, the type of trip 422, in an exemplary embodiment, may be used to influence filtering/rating/presenting of proposed POIs by the POI server 145 to occupants of a vehicle during a particular trip. For example, if the trip is a leisurely trip across the country—i.e. the trip itself is the primary vacation activity—then greater flexibility to waypoint types, locations and times is afforded. On the other hand, if the destination of a trip is a business meeting or other event with a need for strict compliance with a schedule, then less flexibility is afforded. The waypoint server 145 employs a less restrictive filter for "diversion" POI proposals (i.e. disregard desired times of arrival at final destination and/or intermediate waypoints) for a leisure trip than a more restrictive filter used to select POI proposals presented to vehicle occupants during a trip where an event (e.g., business meeting, work, wedding, etc.) is scheduled to occur at the final destination at an inflexible time.

Turning to FIG. 3F, a waypoint record represents a specific scheduled visit, to an identified POI on an identified trip. Data contained in the fields of the exemplary waypoint record depicted in FIG. 3F provide information supplementing descriptive information about an identified POI record in the POI table, to render a particular POI visit instance—a waypoint for a particular trip. A waypoint identification 430 uniquely identifies a particular visit to a POI identified by a parent POI identification 432 corresponding to a particular POI record (see FIG. 3C) within a POI table. The identified waypoint corresponds to a POI scheduled to occur during a current trip identified by a parent trip identification 434 corresponding to a particular trip record (see FIG. 3D) in a trip table. Additionally, a time of arrival 436 identifies a scheduled time of arrival at the POI identified in the POI record corresponding to the POI identification 432. A time of departure 438 specifies an estimated time of departure from the POI (based upon expected wait/service time). A purpose 440 specifies an intended activity/purpose for visiting the POI. Additionally, a POI ordering message 442 contains information relating to an order messaging event carried out between the POI management system (POI server 145) and the POI identified in the parent POI identification field 432. The POI ordering message 442 includes, for example, an order for goods and/or services. A configured alerts 444 is a configurable field describing triggering events and responsive notifications/actions carried out by the telematics unit 114 or other appropriate system in response to the triggered event. The configured alerts 444 is used, for example, to specify a pre-ordering time period that specifies a time period that is subtracted from a POI estimated time of arrival, specified in the time of arrival 436, to render a time for triggering transmitting an order message to the POI identified in the parent POI identification 432. Another alert would be an "off-schedule" alert that is issued when the trip, and resulting ETA at a particular waypoint deviates from an originally specified time of arrival, which is stored in the time of arrival 436 of the waypoint record, by more than a configured time period (e.g. 15 minutes). A rating 446 stores a value indicative of the desirability of the particular waypoint. The value for the rating 446 is initially specified during presentation of a POI for consideration for addition to the current trip route. However, the value for the rating 446 is updated to reflect changes in the desirability and/or necessity of the goods/services offered by the POI to vehicle occupants. A delay factor threshold 448 stores a value indicative of relative flexibility with regard to delays incurred by including another waypoint at a point along the trip route before the waypoint described in the waypoint record. Thus, the delay factor threshold 448 for a particular waypoint record is consulted when deciding whether to insert a contemplated POI/waypoint before the particular waypoint record in a configured trip.

Returning to FIG. 2, the POI rater module 260 comprises configurable executable POI record retrieval and processing logic. The POI rater module 260, which executes on the waypoint server 145, performs operations to assign ratings to a set of filtered POIs retrieved from the POI database and query engine 109 based upon a provided search criterion. In particular, the POI rater module 260, in response to a trigger (e.g., a detected status change or event) for a particular trip (scheduled or in-progress), is invoked/activated to produce a set of rated proposed POIs for submission to current vehicle occupants associated with the particular trip, based upon information acquired and managed by the POI providers service 230, the occupant properties service 235, and the vehicle status 240. Such information is obtained, for example, directly from the aforementioned sources and/or indirectly via queries to the database and query engine 109. Operation of the POI rater module 260 is described herein below with reference to FIG. 4.

The resulting rated listing of POIs rendered by the POI rater module 260 can be presented to vehicle occupants in a variety of ways, including a quantity and a frequency of such presentation. The manner in which rated POIs are provided by the waypoint server 145, for presentation by the telematics unit 114, is dictated by configurable operation of a proposed POI module 270. In an exemplary embodiment, the proposed POI module 270 is configured with logic to determine, for an identified vehicle (including current vehicle status) and identified trip (including current vehicle occupants), a set of proposed POIs that are actually provided to the telematics unit 114 for presentation to current occupants of the vehicle 102. By way of example, the proposed POI module 270 carries out several operations, including: organizing/binning the POIs into categorized groups, prioritizing the grouped POIs by POI type, limiting a quantity of proposed POIs (of a given POI type) presented at any given point of time, and throttling/frequency of presenting proposed POIs.

Moreover, in view of the previous processing by the POI rater module 260, the set of actually forwarded proposed POIs includes one or more proposed POIs that exhibit a high degree of desirability/necessity (based upon calculated ratings) to one or more vehicle occupants based upon currently experienced and/or expected conditions. The previous rating of proposed POIs enables the proposed POI module 270 to significantly reduce any negative impact of substantially restricting quantity/frequency of POI proposals to vehicle occupants. Vehicle occupants will receive POI proposals deemed potentially the most desirable and/or relevant without being bombarded by a multitude of irrelevant "advertisements" relating to potential POIs along a currently specified trip path. By way of example, the proposed POI module 270 submits the potentially reduced set of proposed POIs to the telematics unit 114 for presentation to occupants of the vehicle 102. The vehicle occupants thereafter select one or more of the presented proposed POIs for incorporation as waypoints on the particular trip. Thereafter, database commands are issued to the POI database and query engine 109 to update the particular trip record (see FIG. 3D) to include the selected proposed POI. Operation of the proposed POI module 270 is described herein below with reference to FIG. 5.

A waypoint scheduling module 280 is configured to manage scheduled waypoints on defined routes of identified trips. The scheduling module 280 accesses information relating to an identified trip, including: a current route, current road conditions (traffic congestion, road construction and weather), current time, current vehicle location, and a list of currently scheduled waypoints. In an exemplary embodiment, such information is received by the waypoint scheduling module 280 (either directly or indirectly) from: the navigation service 220, the travel conditions service 225, and the trip/waypoint/POI tables within the POI database and query engine 109. The waypoint scheduling module 280 combines the basic travel times along route segments (connecting scheduled waypoints) with specified stopover delays at each intermediate waypoint on the identified trip to provide a complete schedule, including all scheduled waypoints, on the trip. In an exemplary embodiment, operation of the waypoint scheduling module 280 is triggered in response to receiving a notification of a trip update event corresponding to addition of the selected proposed POI to the particular trip record in the POI database and query engine 109. Operation of the waypoint scheduling schedule module 280 is described herein below with reference to FIG. 7.

Figure 9:
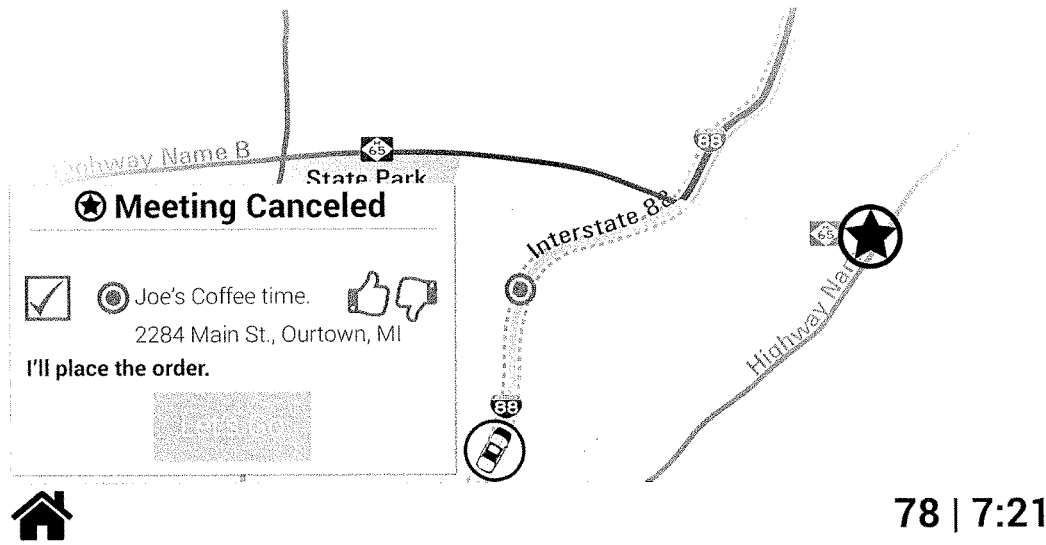
FIG. 9 is an exemplary graphical display depicting a proposed POI as an overlay on a navigation user interface touchscreen.
Figure 10:
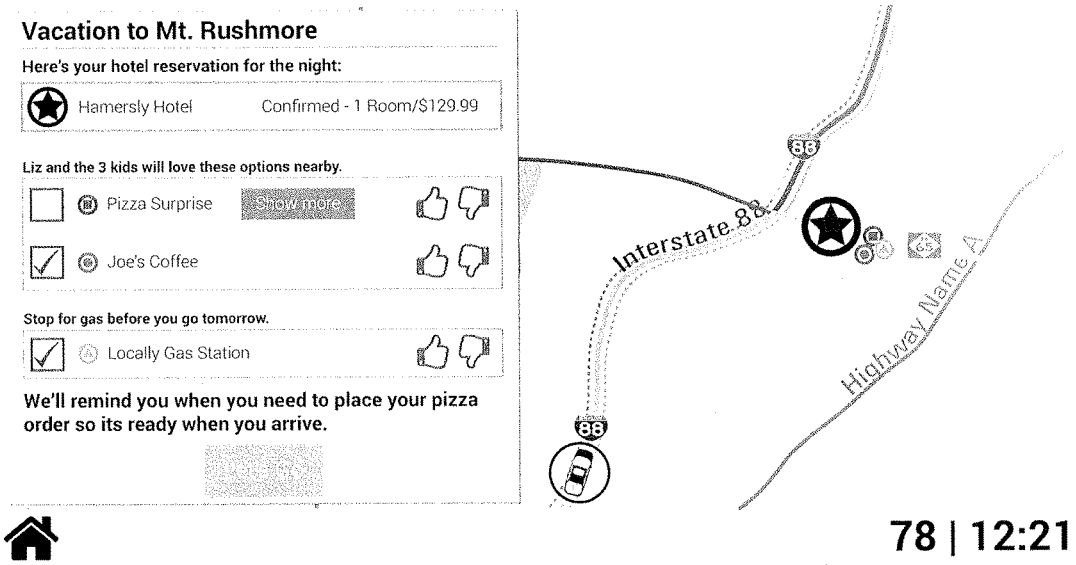
FIG. 10 is an exemplary graphical display depicting a proposed group of POIs as an overlay on a navigation user interface touchscreen.

A waypoint display module 290 is configured to provide a description of a currently configured set of waypoints, on an identified trip, to an identified vehicle for presentation to vehicle occupants. The waypoint display module 290 receives an identified trip as input. The identified trip, in turn, enables the waypoint display module 290 to access a variety of information pertinent to formulating an updated display definition for presentation to vehicle occupants. Such information includes: a list of currently scheduled waypoints on the identified trip (with times provided by the scheduling module 280) and a list of currently proposed POIs (provided by the proposed POI module 270). The waypoint display module associates each currently scheduled waypoint with a map coordinate for rendering on a graphical display output depicting a map including: (1) a trip route that passes through all scheduled waypoints and (2) a set of nodes corresponding to each one of the currently scheduled waypoints. The waypoint display module 290 also generates overlay images/controls corresponding to selectable proposed POIs associated with the identified trip. Exemplary graphical map output generated by the telematics unit 114 and presented on the display 117 is depicted in FIGS. 9 and 10. In an exemplary embodiment, operation of the waypoint display module 290 is triggered in response to receiving a notification of a trip schedule update event corresponding to the update of the particular trip record in the POI database and query engine 109 by the waypoint scheduling module 280 as a result of selection of one or more proposed POIs. The waypoint display module 290 is also configured to provide for local presentation (audio and/or visual output) alert messages and any other notifications relating to scheduled waypoints, including displaying information relating to an approaching waypoint contained in or relating to a corresponding waypoint record (see e.g., FIG. 3E). Operation of the waypoint display module 290 is described herein below with reference to FIG. 8.

A waypoint provider message module 295 carries out, in an exemplary embodiment, messaging to POIs on behalf of vehicle occupants after a proposed POI has been added to the particular trip. The waypoint provider message module 295 uses any of a variety of potential messaging modes (email, instant messaging, etc.) to submit information relating to the newly added waypoint corresponding to a selected proposed POI. The content of the message can be rendered without direct user intervention based upon previously configured vehicle occupant information (e.g. a repeated beverage purchase from a particular coffee shop) and/or additional designated order information added by the vehicle occupant when selecting the proposed POI—e.g. a complete order for food by identified vehicle occupants. Additionally, the waypoint provider message module 295 is configured to attach an estimated time of arrival of the vehicle based upon the currently designated set of waypoints on the particular trip. Moreover, the message can include any special offers, accounts for payment of the order, etc. linked to the selected proposed POI that should be applied to an order. Additionally, if the scheduled time of arrival at a previously messaged POI needs to be updated due to a substantial change (e.g. 10 minute deviation from previous estimate), then an update message is issued by the waypoint provider message module 295 to the affected POI.

Moreover, if a selected proposed POI relates to an order for an item that can be prepared in advance of the vehicle's arrival at the POI (e.g., an order for a restaurant or coffee shop), then the system can add an alert/event to the trip data structure indicating a time for triggering an "order" event. When an order event is triggered, the system executes operations to initiate submitting an indicated order (e.g. a pizza, coffee, donuts, etc.) to a specified POI associated with the triggered order event. The actual ordered item listing is transmitted by the system (e.g., POI server 145) via automated messaging or alternatively the order causes presentation of an alert/reminder (including provided/pre-configured contact information) to the user to place the order at the previously designated POI/waypoint. When an ordering event is created, a graphical indication is added to the displayed route indicating a geographic position of the vehicle along the route corresponding to a time at which the order submission event is triggered. The geographic position at which the order submission is to be triggered is updated periodically to reflect changing travel/road conditions and actual progress of the vehicle along the current trip route.

A waypoint server task scheduler module 299 carries out, on a scheduled/triggered/repeating basis, a set of calls to the modules of the waypoint server 145 described herein relating to establishing proposed POIs as waypoints and thereafter tracking vehicle progress in relation to a set of scheduled waypoints for a particular vehicle. The following is an exemplary, non-exhaustive list of triggers that potentially cause the task scheduler module 299 to invoke operation of one or more of the modules identified in FIG. 2, such as the POI rater module 260 to cause a next iteration of acquisition of an updated filtered set of potential proposed POIs for presentation to vehicle occupants. The exemplary potential triggering conditions include: sensed driver fatigue parameter (time without rest, weaving, etc.) reaches a critical level, low fuel level, a configured time of day, a change in an appointment calendar accessible by the system (see FIG. 9), a historically repeated action (e.g., stop for coffee/donut purchase), a configured task (e.g., purchase milk), sensed weather event (e.g., severe weather warning), traffic event (e.g., an accident along route to destination causing a traffic stoppage), cancellation of previously registered event affecting traffic along route, configuration module 250 caused a reconfiguration of one (or more) of the configured table records of FIGS. 3A-F (vehicle, POIs, Occupants, trip, waypoints, etc.), new promotion/offer issued to vehicle occupant(s), vehicle started/put in drive, a change in estimated time of arrival at a currently scheduled waypoint or the final destination (by more than a configured threshold amount), a change in status of a currently pending order at a scheduled waypoint (e.g., order cannot be fulfilled prior to arrival, no vacancy at a scheduled overnight hotel stay, restaurant reservation not available/delayed), expiration of a configured wait period between iterations (e.g., 5 minute repetition timer).

Figure 4:
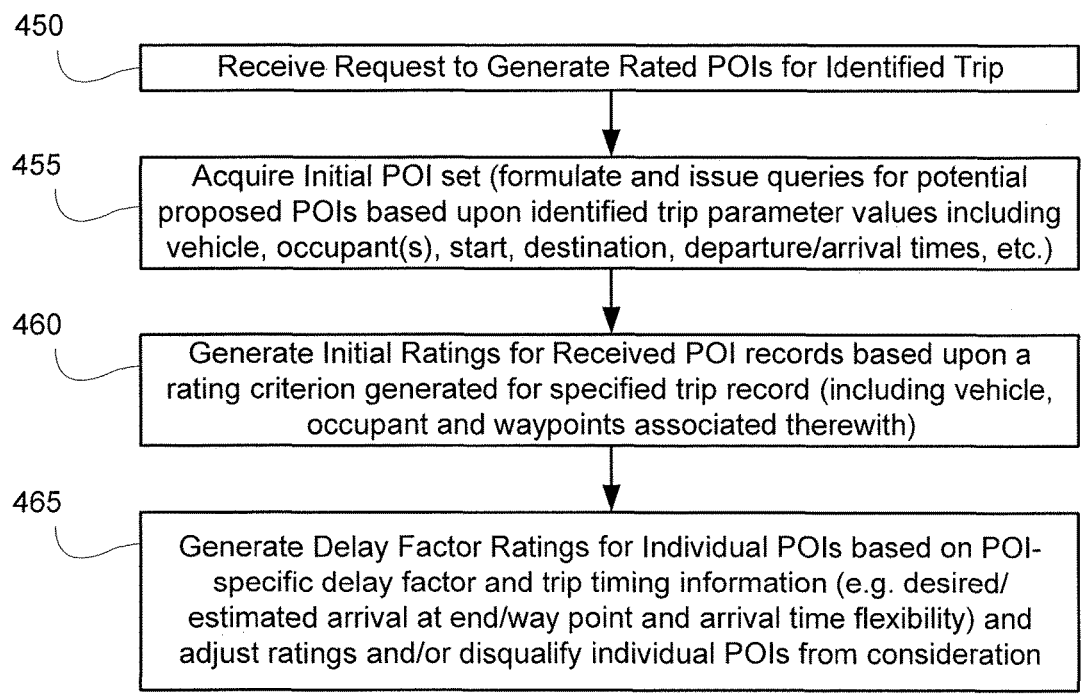
FIG. 4 is a flowchart summarizing a set of stages/operations for generating a set of rated POIs based upon a specified trip identifying a current route, a vehicle, and vehicle occupants.

Turning to FIG. 4, an exemplary set of operations are summarized with regard to the POI rater module 260 initially described herein above with reference to FIG. 2. After receiving the request including the unique trip identifier, the POI rater module 260 invokes a set of (conditionally) executed operations resulting in a set of rated POIs for further processing and presentation to occupants of a vehicle identified in the configured trip record structure having a value in the Trip_ID 400 matching the trip identification value provided in the received request for rated POIs for the identified trip.

During 450 the POI rater module 260 receives a request (e.g. a command issued by the waypoint server task scheduler module 299) to generate a set of rated POIs based upon a provided unique trip identifier corresponding to the value stored in the Trip_ID 400 of a configured trip structure (see FIG. 3D).

Thereafter, during 455 the POI rater module 260 selectively acquires an initial set of proposed POIs. In an exemplary embodiment, the POI Providers Service 230 accumulates potential proposed POIs from a variety of proposed POI sources and stores the accumulated potential proposed POIs within tables of the POI database and query engine 109. In such exemplary implementation, during 455 the POI rater module 260 issues queries to the POI database and query engine 109 according to a search criterion. The search criterion enables identifying responsive POIs and comprises one or more of a group of potential POI filter types including, for example: POI type—vehicle/occupant needs (gas, food, rest, entertainment, etc.), location/distance (distance from current vehicle location and detour distance added to current route if selected), gender centricity, occupant favorites, business/service hours, estimated time for service, price/cost, user ratings, etc. See FIG. 3C for additional examples of POI properties/search parameters potentially used as search filters.

The particular configurable values assigned to the search criterion parameter types (mentioned above) may be calculated/established based upon properties of the selected particular trip record. In addition to the properties of the particular trip directly defined within the fields of a record in trip table (see FIG. 3E—trip destination 404, destination time/day 406, current route 409, current route ETA 410) of the POI database and query engine 109, the search criterion parameters are determined by property values specified in records for the vehicle (see FIG. 3A), current occupants (see FIG. 3B) and currently designated/incorporated waypoints (see FIG. 3E) associated with the particular trip (e.g., identified in the property fields for a record corresponding to the particular trip in the POI database and query engine 109).

The set of sources from which the POI rater module 260 acquires the initial set of proposed POIs is extensible, and thus in exemplary implementations the POI rater module 260 receives potential proposed POIs from sources other than the POI database and query engine 109. For example, the potential proposed POIs from the database and query engine 109 are augmented by a listing of POI types/instances (e.g. favorites) expressly specified (e.g. previously selected) by one or more identified occupants in accordance with contents of occupant data structure records. See FIG. 3B. The POI type/instance favorites are maintained in an occupant-specific listing tied to a particular vehicle occupant. See FIG. 3B. The above are just two examples of sources from which the POI rater module 260 acquires an initial set of POIs. Other sources are envisioned in this as well as other implementations. Thus, in summary, during 455 the POI rater module 260 performs a filtered retrieval of potential POIs for a particular designated trip.

Thereafter, during 460 the POI rater module 260 assigns initial rating values to the POI records received during 455. By way of example, the POI rater module 260 applies a configurable rating criterion/formula to render an initial rating for each potential POI retrieved during 455. The configurable POI rating criterion/formula incorporates a set of factors including, for example: (1) current estimated time of arrival at a scheduled point of the particular trip, (2) a targeted (e.g., desired/needed) time of arrival at the scheduled point of the particular trip, (3) level of importance to arriving at the scheduled point of the particular trip at/before the targeted time of arrival, (4) road conditions, (5) vehicle status (e.g. remaining fuel range), (6) type of trip, (7) current needs fulfilled (e.g. fuel and food), (8) vehicle occupant preferences for particular POI proposals (including previous POI proposal acceptances), etc. The operation of the rating generation aspect of the POI rater module 260 is described further herein below with reference to various particular examples of applying a rating criterion/formula based upon a variety of information relating to a particular trip described by a set of properties (including current needs of an identified vehicle and/or occupants) acquired from internal and/or external information sources. A rating for particular POIs may be based upon a source (e.g. a promotion/advertisement) of the proposed POI.

Furthermore, while the potential POIs may be assigned a single rating value, it is contemplated that, rather than incorporate current need/necessity of a vehicle/occupants into a single POI instance rating, at least a second, separate rating is maintained for a POI type that indicates a relative importance/need/necessity of a particular type of POI at a particular stage of the currently contemplated route for the identified trip. For example, a need rating is separately maintained for the following types of POIs: gasoline stations, lodging/overnight rest areas, driver rest areas, etc. The POI type/category need-based rating is used, for example, to perforin a two-tiered sort that conducts a primary sort to identify a highest priority POI type/category based upon need (e.g. gasoline) and then executes a secondary sort based upon individual POI ratings within the POIs identified with each particular POI type.

Additionally, the POI rater module 260, described by way of example herein, is configured to determine/apply a "delay factor rating" value associated with individual ones of the potential proposed POIs for which initial POI ratings were rendered during 460. Thus, after assigning an initial rating to a received POI, control passes from 460 to 465 wherein the POI rater module 260 generates and applies delay factor ratings associated with potential proposed POIs to the delay factors 420 specified for a particular trip. The POI rater module takes into account both: (1) a POI-specific delay, and (2) timing information relating to identified waypoints on the currently specified trip. The delay factor rating operation carried out during 465 carries out dual functionality of: (1) filtering (i.e. disqualifies) potential proposed POIs that introduce an unacceptable delay, and (2) rating adjustment to modify relative desirability of potential proposed POIs based upon the delay incurred in reaching subsequent waypoints and the final destination of a currently scheduled trip. The operation of the POI rater module 260 during 465 possesses an ability to greatly reduce the quantity of poor (unreasonable) proposed POIs to vehicle occupants that are otherwise highly likely to be presented to the vehicle occupants based upon other factors (e.g. a user's indicated favorite coffee shop).

During 465, the delay factor rating for a proposed POI is generated on an individual basis for each waypoint subsequent to the proposed POI on the current trip route, also an overall delay factor rating for the trip is determined by processing as a complete set the set of delay factor ratings and associated delays previously determined on an individual basis. Examples of calculations of overall delay factor ratings include: (a) sum of all delay factor ratings across all waypoints, (b) maximum delay factor rating across all waypoints, (c) final delay time in reaching final destination, etc. The estimated time delay at each waypoint that is introduced by adding a potential POI as a new waypoint takes into account business hours and other potential time constraints imposed at individual ones of currently designated waypoints on the current trip.

In an exemplary system, an estimated delay factor (stop durations) provided for a particular potentially proposed POI (e.g. a fast food restaurant or a coffee shop) is calculated based upon a global delay factor and a delay delta value attributed to the particular user that either increases or decreases the initially provided global delay value, thereby providing a more accurate delay estimate based upon individual behavior at particular waypoints. After completing a stop at a particular POI/waypoint, an actual delay is compared against a previously estimated delay factor. Any deviation is tabled to both the individual and global delay instances registered for the particular visited POI to help improve accuracy estimates (both in the short term and long term, for the particular individual as well as globally). For example, a 15 minute delay estimate reported by a coffee shop for a particular individual having a delay delta value of 3 minutes results in an estimated delay factor of 18 minutes for the particular user at this instance in time. If the actual delay turns out to be 20 minutes (2 minutes slower than the estimate), then the additional two minute delay is used to update both the 15 minute (short term) global delay reported by the coffee shop as well as adjust the individual delay delta value. Both the global delay factor and the delay delta value are filtered so that a single instance will not have a substantial effect on the stored values. Thus, the delay may be compared to previous stops by the user as well as other users at the same waypoint to adjust either, or both, the global delay factor and/or the individual delay delta value to enable a current adjustment to the provided estimate.

During 465 the POI rater module 260 determines a degree of delay associated with incorporating a particular proposed POI as a new waypoint in the current trip route. After calculating an estimate for a delay introduced by adding the particular proposed POI to the trip route, a delay factor rating is generated based upon the estimated delay's impact upon a currently configured waypoint (including the destination waypoint) on the current trip route.

In addition, an overall delay factor rating is rendered by considering the estimated delay's impact upon each of the currently designated waypoint arrival times on the current trip. In a simplest case, the overall delay factor rating is the maximum (magnitude) delay factor rating of the set of delay factors generated for waypoints on the route. Alternatively, an average delay factor value is calculated for the overall delay factor rating.

After calculation, the "delay factor rating" is specified by the POI rater module 260 in a variety of ways for the initially rated POIs rendered during 460. In a first case, the delay factor rating is specified as a separate and distinct rating value from the initial POI rating value. In a second case, the delay factor rating value is specified as an adjustment value for the initial POI rating value rendered during 460. In yet other embodiments, the delay factor rating is determined and specified as both a separate value and as an adjustment (reduction) to an initial rating value (established during 460) for an initially rated POI. Thus, a variety of ways of specifying the delay factor rating for a particular POI are contemplated.

Additionally, the "delay factor rating" stage 465 potentially applies a previously specified delay factor rating value in a variety of ways. Such variety of ways of applying a specified delay factor includes applying an initially calculated delay factor rating value as: (1) an adjustment to a previously specified POI rating value and/or (2) a disqualifier of a previously received/rated POI (if an unacceptable estimated delay is introduced by the addition of a corresponding waypoint)—without regard to an initial rating assigned to the POI during stage 460. The delay factor rating is applied individually to the delay factors 420 for a specified trip, including individual delay factors specified for each subsequent waypoint on the route. The delay factor rating is also used to generate an overall delay factor rating on the trip as a whole (cumulative delay on each subsequent waypoint, including the endpoint).

A large delay factor rating threshold value indicates a high degree of arrival time flexibility by vehicle occupants, while a low delay factor rating threshold value indicates an inflexible deadline for arrival of one or more of the identified vehicle occupants. Thus, for example, a user specifies a value between zero and ten for the delay factor threshold— e.g., zero indicating highest flexibility and ten indicating no flexibility in time of arrival. The delay factor threshold specified for one or more vehicle occupants is furthermore designated automatically based upon sources of schedule information such as calendars, specified destination type, and/or occupant history (previous visits to the indicated destination at a particular time, day of the week, and/or date).

With regard using the "delay factor rating" as a disqualifier of an initially rated POI, during 465 the POI rater module 260 compares the overall delay factor rating to a potentially configurable "delay factor rating threshold" (potentially for a specific POI type) for the current trip in the delay factors 420. If the comparison between the delay factor rating and the threshold value indicates a delay impact that exceeds an acceptable degree of delay for the trip (or a particular waypoint on the trip), then the POI is disqualified by the POI rater module 260 from further consideration.

However, if the threshold is not exceeded, then the delay factor rating for the POI is used to either lower the initial rating (from 460) for the POI, or provide a separate rating tied to delay alone that is provided in a separate rating field from the initial rating for the POI based upon the necessity/ desirability of the POI to vehicle occupants. Thus, if a potential POI would materially/substantially upset a currently scheduled time of arrival at a configured waypoint of a trip, then the overall rating assigned to the potential POI is lowered by an amount (either by subtraction or by multiplying by a fractional value less than one) taking into consideration the severity of the delay introduced by incorporating the proposed POI into the trip.

Thus, in accordance with the above-described operations, the POI rater module 260 operates to acquire a filtered set of potential POIs for presentation to vehicle occupants. The POI rater module 260 thereafter proceeds to further filter (disqualify) and generate ratings for the potential POIs to facilitate arranging and presentation of the potential POIs to the vehicle occupants in accordance with the further operations of the modules of the waypoint server 145 described herein.

Figure 5:
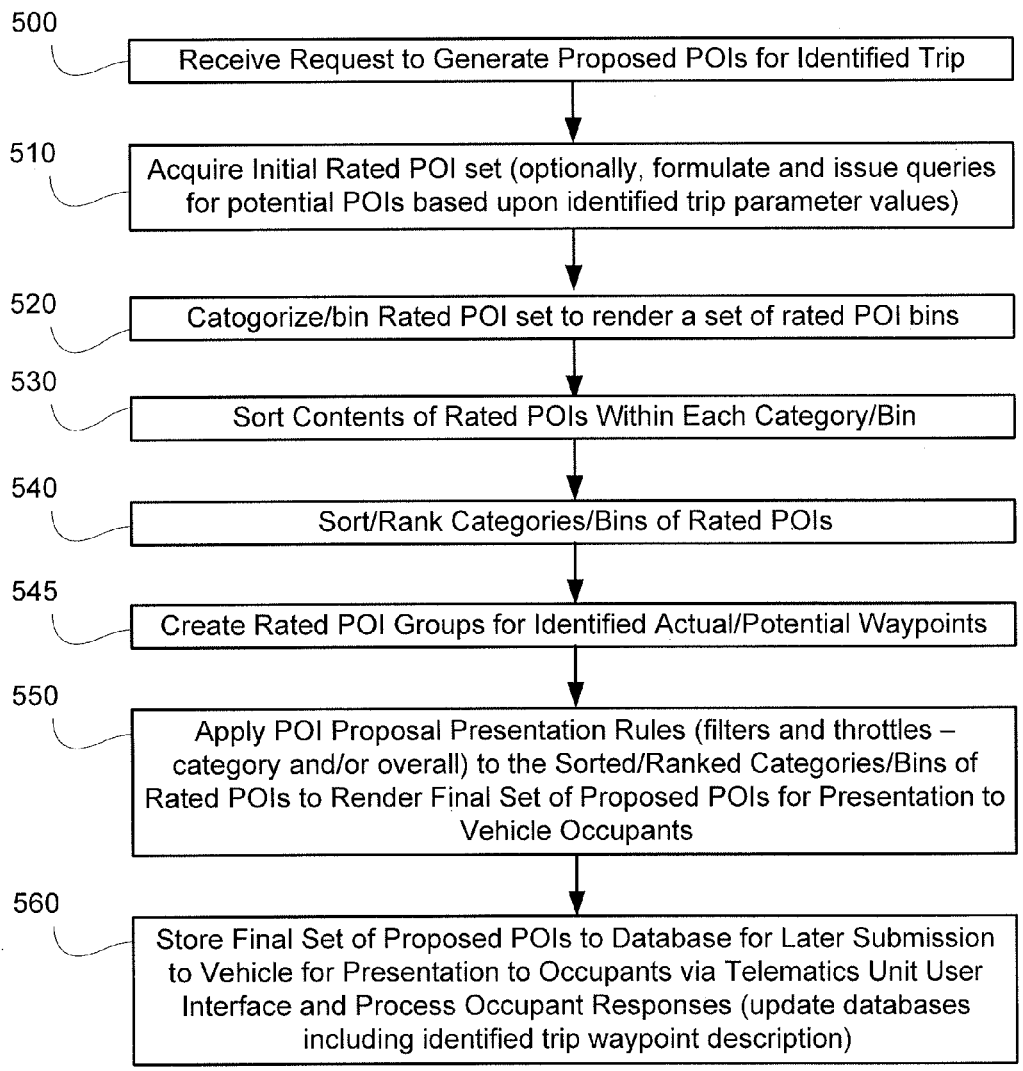
FIG. 5 is a flowchart summarizing a set of stages/operations for generating a set of proposed rated POIs.

Turning to FIG. 5, an exemplary set of operations and decisions are summarized with regard to the proposed POI module 270 initially described herein above with reference to FIG. 2. In general, the proposed POI module 270, after being invoked by the waypoint server task scheduler module 299, determines, for an identified vehicle (including current vehicle status) and identified trip (including current vehicle occupants), a set of proposed POIs that are actually provided to the telematics unit 114 for potential presentation to current occupants of the vehicle 102. By way of example, the proposed POI module 270 carries out several operations, including: organizing/binning the POIs into categorized groups, prioritizing the grouped POIs by POI type, limiting a quantity of proposed POIs (of a given POI type) presented at any given point of time, and throttling/frequency of presenting proposed POIs. In the illustrative embodiment, the proposed POI module 270 operates upon the filtered/ rated POI records rendered by the POI rater module 260. Thus, the set of proposed POIs rendered by the proposed POI module 270 exhibit a high degree of desirability/ necessity (based upon calculated ratings) to one or more vehicle occupants.

The proposed POI module 270 operates to present localized groups of proposed POIs meeting a threshold rating. The proposed POI module 270, by way of example, employs "POI grouping logic" to minimize delay by selecting POIs from distinct categories, addressing multiple actual/inferred needs, on a grouped (multiple categories/current needs) basis when multiple vehicle/occupant needs (e.g. food, gas, lodging) are likely to be present when a particular locality is encountered during a trip. The particular locality must include at least one responsive POI instance, corresponding to one of the categories/needs. Thus, instead of grouping multiple POIs by a single category, in this case the POI grouping logic of the proposed POI module 270, when generating a proposed group POI at a particular locality, operates to select a highest rated POI for each one of a plurality of specified categories (e.g. food, gas, lodging, etc.)—each category corresponding, for example, to a current need for the vehicle/occupants that may be fulfilled at the particular locality. The particular locality may be determined in any of a number of ways. By way of example, the particular locality is specified when a user designates a new waypoint on the current trip. Thus, designating a (proposed) individual POI as the new waypoint invokes POI grouping logic to generate the group POI. Alternatively, the particular locality may be determined based upon an implied critical need (e.g. low gas) at the particular locality. Thus, the proposed POI module 270 selects the particular locality based upon a selected and/or predicted POI instance. The POI grouping logic thereafter creates a proposed group POI, using the particular locality, by: (1) determining contemplated needs of the vehicle/occupants—and corresponding POI categories, and (2) selecting a POI instance for each of the identified POI categories.

Thus, the proposed POI module 270 may override a higher rated (or previously selected) individual proposed POI, for a lower rated alternative POI of the same type (e.g. gas station) that offers the advantage of being in a same particular locality as other POI instances meeting specified/ inferred needs/POI categories (e.g., food, lodging, etc.).

The proposed POI module 270, during operation, presents a further opportunity to disqualify or at least lower the ranking of potential proposed POIs based upon potential delays introduced to a specified trip as well as the delay factors 420 specified for the trip (including delay factors associated with currently configured waypoints that may be impacted by adding the potential proposed POI as a new waypoint).

Turning to the specific operations summarized in FIG. 5, during 500 the proposed POI module 270 receives a request (e.g. a command issued by the waypoint server task scheduler module 299) to generate a set of proposed POIs based upon a provided unique trip identifier corresponding to the value stored in the Trip_ID 400 of a configured trip structure (see FIG. 3D) enabling the proposed POI module 270 to query relevant secondary data sources, including currently designated waypoints, to identify needs at particular locations along a trip route currently associated with the identified trip. After receiving the request including the unique trip identifier, the proposed POI module 270 invokes a set of (conditionally) executed operations resulting in a set of proposed POIs (stored in the proposed POIs 426 structure for the identified trip) for further submission to the telematics unit 114 for presentation to occupants of the vehicle 102 identified in the configured trip record structure having a value in the Trip_ID 400 matching the trip identification value provided in the received request for proposed POIs for the identified trip.

During 510 the proposed POI module 270 retrieves a set of rated POIs from the POI database and query engine 109, including the ratings previously provided by the POI rater module 260, based upon a provided unique trip identifier corresponding to the value stored in the Trip_ID 400 of a configured trip structure (see FIG. 3D). The retrieval of the set of rated POIs is, for example, simply a request to provide all the rated POIs rendered by the POI rater module 260 for the identified trip. Alternatively, the retrieval of POIs during 510 is a structured query of the type described previously herein above with reference to operation 455 of FIG. 4.

Thereafter, during 520, the proposed POI module 270 carries out a classifying operation resulting in a set of binned rated POIs. During the binning operation, the proposed POI module 270 groups the acquired rated POI instances according to a set of classifications. Examples of such classifications are: gas stations, restaurants, hotels, roadside public rest areas, etc. Additionally, binning/categorization can be performed based upon delay factor (e.g., low impact, medium impact, high impact).

During 530 the proposed POI module arranges/sorts the POI instances within each category. Such sorting can comprise single or multiple staged sorts. For example, in a case where only a single overall rating (combining scores for a set of characteristics including delay factor, cost, service/product rating, etc.) is used to rank the rated POIs within a category, a simple sort occurs. However, the proposed POI module 270 is, for example, configured to perform a multi-tier sort defined by importance assigned each one of a set of characteristics of POIs including: delay factor, service/product rating, cost, etc.

During 540 the proposed POI module 270 ranks each of the bins containing at least one item (previously sorted during 530). By way of example, the ranking of bins can be based upon current needs of the vehicle and/or the occupants for the identified trip. For example, if a vehicle is determined to be nearly out of gas (and a gas station waypoint is not specified within a specified distance from the current vehicle location), then the "gas station" category is assigned a high necessity value, resulting in the gas station category receiving a relatively high rank for presenting at least one proposed POI to the vehicle occupants. Moreover, by way of example, a need is dynamically assigned based upon observed status of the vehicle and/or occupants. Thus, in the provided gas station example, as the remaining fuel range decreases (without a waypoint being added within the fuel range), the priority of the "gas station" bin of POIs rises to a configured higher priority (e.g. urgent/essential) as the number of potential refueling stations reduces. Similar heightened prioritization determinations are appropriate for other POI types/classes including: rest stops, lodging, restaurants, etc. Such prioritization determinations (increases or reductions) can be based upon, for example, elapsed time since last use of the particular POI type, time of day, "last chance" for an available instance of a particular POI type for a specified distance/time, etc.

During 545 the proposed POI module 270 conditionally executes to render rated POI groups at actual/potential waypoints (localities) along a currently specified route for the identified trip. In particular, during 545 the proposed POI module 270 initially identifies a current set of either actual or estimated waypoints configured on the identified trip route. Actual waypoints correspond to stopping points on the trip route at designated POIs. Additionally, proposed waypoints are also inserted along a trip route based upon estimates/predictions of vehicle/occupant needs along the trip route. In that regard, for each indicated need (e.g., gas, food, lodging, etc.) at a locality corresponding to a particular waypoint, the proposed POI module 270 obtains the highest rated POI meeting the indicated need (e.g. gas). The ratings of individual POIs, rendered by the POI rater module 260 discussed herein above, are combined to render a "group POI rating" for a particular actual/potential waypoint location. If the group POI rating is sufficiently high, then the proposed POI module 270 adds the rated group POI to a listing of POIs to be presented to users via the telematics unit 114 graphical user interface. See FIGS. 9 and 10.

With continued reference to FIG. 5, and in particular operation 550, the received rated listing of POIs (rendered by the POI rater module 260) can contain a quantity of POIs that exceeds a POI presentation quantity/frequency limitation. To address this, the proposed POI module 270, by way of example, applies configured POI proposal presentation rules (e.g. frequency of presentation, form of presentation, minimum rating, etc.) for the identified vehicle and identified trip/vehicle occupants to the received listing of filtered and rated POIs to render a potentially reduced final set of proposed POIs (top proposed POI options) to the telematics unit 114. Thus, the Proposed POI module 270 ensures the quantity/frequency of proposed POI submissions by the waypoint server 145 to the telematics unit 114 does not violate configurable proposed POI quantity/frequency limitations which may be specified on an overall or category basis. See e.g., Rating Threshold/POI Proposal Frequency 424.

During 560, the proposed POI module 270 stores the finalized listing(s) of proposed POIs to the proposed POIs 426 structure for the identified trip. The proposed POIs are thereafter submitted to the telematics unit 114. To that end, the exemplary proposed POI module 270 is configured to store the ordered listings to the proposed POIs 426 for an identified trip that, in turn, enable carrying out an orderly forwarding to the telematics unit 114, in an orderly manner, one or more of the proposed POIs contained in the final set of proposed POIs, when such need arises. In that regard, the proposed POI module 270 monitors a variety of factors (e.g. traffic, upcoming maneuver, weather, user response rate to previous submitted proposed POIs) to determine when to issue a next proposed POI (or set of proposed POIs) to the telematics unit. The throttled submission of proposed POIs continues, during any given iteration of the operations set forth in FIG. 5 until, for example, a repetition time period expires or all proposed POIs from the final set of proposed POIs have been submitted to the telematics unit. At this point, the proposed POI module 270 has completed its sequence of operations and awaits a next invocation of its operation, for the identified trip, by the scheduler 299. Thus, in this particular example, the scheduler 299 determines when an iteration of the operations depicted in FIG. 5 are performed by the proposed POI module 270.

In response to receiving the proposed POIs, by way of example, the telematics unit 114 presents the proposed POIs to occupants of the vehicle 102 via display 117 or speaker 118 (potentially in the form of a short advertisement). By way of example, the frequency, quantity and manner of presentation by the telematics unit 114 is configurable at the vehicle 102, and thus the final presentation is a matter of choice by the occupants of the vehicle 102 that can be designated by configuration of a proposed POI user interface function incorporated into the telematics unit 114. Moreover, by way of example, the proposed POI module 270 causes the telematics unit 114 to initially present the above-described (see step 545) grouped set of POIs to a user. However, after presentation of the grouped set of categorized POIs to a user, the user may request (by indicating such via the user interface) the proposed POI module 270 to additionally provide, to the telematics unit 114, a listing of "n" top rated options for a particular category of POI. By way of example, a user may request providing a ranked listing of POIs under one of the categories represented within the initially presented grouped set of POIs by selecting a POI list icon for the particular category of interest displayed on the touchscreen user interface display containing the grouped POI listing.

With continued reference to operation 560 of the proposed POI module 270, the vehicle occupants thereafter select one or more of the presented proposed POIs for incorporation as waypoints on the particular trip. The information associated with the selected proposed POI is forwarded by the telematics unit 114 to the proposed POI module 270, as a response to a request by the proposed POI module 270 containing one or more proposed POIs for the particular trip. The proposed POI module 270, issues database commands to the POI database and query engine 109 to update the particular trip record to include the selected proposed POI as a new waypoint. The updates to the identified trip data structures include updating the trip route as well as the estimated times of arrival/departure of any waypoints that occur after the new waypoint on the identified trip.

In exemplary systems, the proposed POI module 270, when monitoring responses to previously submitted proposed POIs, additionally records both active rejections and passive rejections of proposed POIs by vehicle occupants. Passive rejections (from lack of user response), by way of example, are treated by the proposed POI module 270 as demonstrating a low interest for a category of POI with which the rejected proposal is associated. On the other hand, active rejections (from an affirmative rejection action by a user), by way of example, are treated by the proposed POI module 270 as demonstrating an interest in the category and requesting an alternative proposed POI to the rejected proposed POI. As such, the proposed POI module 270 exhibits short-term adaptability regarding an order in which particular ones of the final set of proposed POIs are presented to vehicle users. Additionally, active rejections may result in noting the non-selection in a record associated with the vehicle occupant (if known) that rejected the proposed POI. The proposed POI module 270 may also issue a follow-up query if, for example, a highly rated proposed POI is actively rejected. The follow-up query may request identification of a particular reason for actively rejecting the proposed POI. The reason may cause the rating to lower for the particular rejected proposed POI instance/type or stay unchanged (schedule does not permit adding the proposed POI as a waypoint) based upon the provided reason for rejection. If a desired time of arrival at the destination or any currently scheduled waypoint has changed, the active rejection of a proposed POI presents an opportunity for vehicle occupants, in their response message to the proposed POI module 270, to update the time/schedule change.

Figure 6:
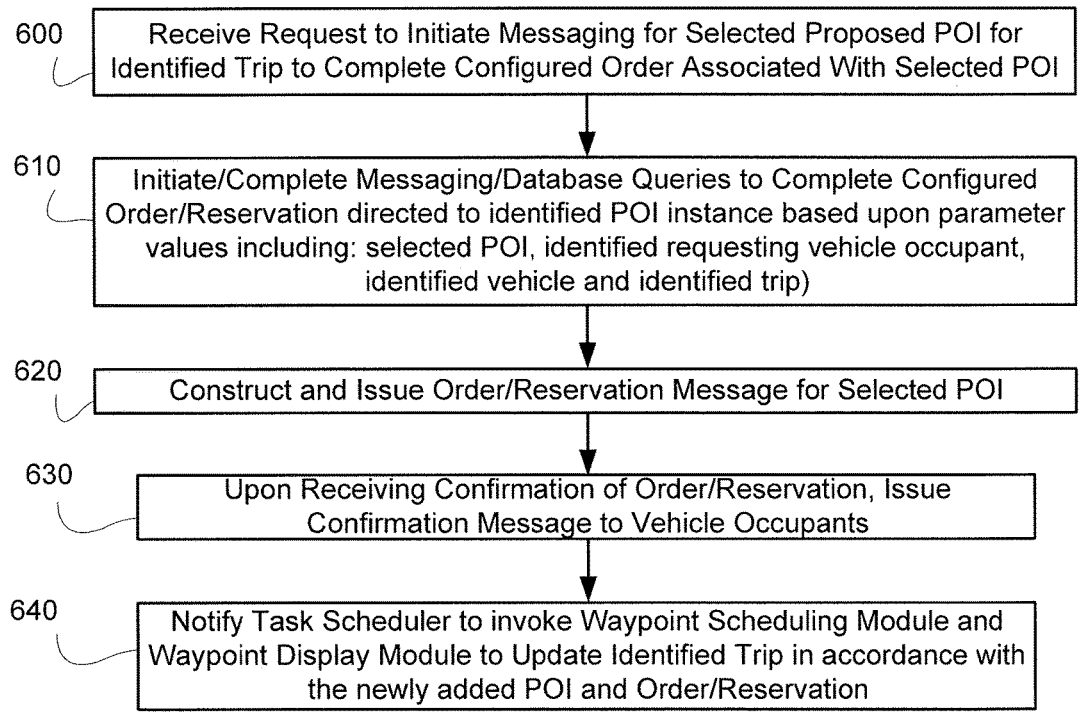
FIG. 6 is a flowchart summarizing a set of stages/operations for generating/issuing messages on behalf of vehicle users in association with POIs selected and registered as waypoints along a current trip route.

Turning to FIG. 6, an exemplary set of operations and decisions are summarized with regard to operation of the waypoint provider message module 295 initially described herein above with reference to FIG. 2. In general, the task scheduler module 299 invokes the waypoint provider message module 295 in response to adding a new POI to an identified trip. Adding the new POI occurs, for example, in response to a vehicle occupant/user selecting a proposed POI submitted by the proposed POI module 270 during step 560 (described herein above).

By way of background, in association with adding the new POI to the identified trip, the proposed POI module 270 (or alternatively the scheduler module 299) determines whether any messaging is needed with the selected POI to register an order/reservation in association with the selected proposed POI (e.g. a food/coffee order, reserve a recharging station for an electrically powered vehicle, etc.). If such messaging is needed to register the order, then the scheduler 299 (in response to an indication of such need by the proposed POI module 270) invokes the waypoint provider message module 295 to carry out the desired/required messaging on behalf of the vehicle occupant(s) that selected the proposed POI—optionally further responding to the proposed POI module 270 with a particular order/reservation request. The description below summarizes, by way of example, the operation of the waypoint provider message module 295 after the task scheduler module 299 issues a request based upon the above-described response from vehicle occupants indicating acceptance of a proposed POI (requiring additional messaging to complete an order/reservation).

In particular, during 600 the waypoint provider message module 295 receives a notification from the task scheduler module 299 identifying at least the accepted proposed POI for an identified trip. The notification may also include a variety of information enabling the waypoint provider message module 295 to complete the order/reservation associated with the accepted proposed POI. For example, the message invoking the waypoint provider message module 295 includes specific POI contact and order descriptions. However, in other instances, the waypoint provider message module 295 merely includes data structure instance identifiers for: (1) POI instance contact information (see FIG. 3C) and/or (2) a responding vehicle occupant's default order/reservation for the identified POI (e.g. a stored email address and coffee/snack/meal order for a particular coffee shop along a route to a driver's office).

During 610, the waypoint provider message module 295 executes messaging and/or one or more database queries to acquire any information needed to complete submitting a request to the identified POI corresponding to the received order/reservation. By way of example, the waypoint provider message module 295 carries out messaging/querying operations, including issuing queries to a database including descriptions of: (1) an occupant (see FIG. 3B) and (2) a POI instance (see FIG. 3C) to complete a reservation/order template. Additionally, or alternatively, the waypoint provider message module 295 carries on an interactive communication session with one or more vehicle occupants, via the telematics unit or via email messages directly to occupant smart phones, to complete/confirm an order/reservation. In the case of an order from a restaurant, a message including a simplified version of the menu may be provided—from which the user responds with appropriately filled response fields. The response message is processed by the waypoint provider message module 295. Among other things, the order/reservation may include an indication of a promotion/offer that may have been included in the proposed POI message previously constructed and provided by the proposed POI module 270 to vehicle occupants (resulting in the accepted proposed POI and subsequent order/reservation generation during 610).

Moreover, during 610 the waypoint provider message module 295, by way of example, also calculates an estimated time of arrival based upon information provided by a navigation service 220 and provided current location information of the identified vehicle. The estimated time of arrival accompanies the order/reservation information in the message issued to the identified POI instance. Thus, during 610 the waypoint provider message module 295 executes a series of tasks (messaging and/or database querying) to render a completed request message to the identified POI at which a particular identified service and/or product is to be provided at a requested time (based upon the provided time of arrival).

Thereafter, during 620, the waypoint provider message module 295 carries out a messaging operation to construct and issue a message to the identified POI instance based upon the order/reservation information previously assembled during 610.

During 630, upon receiving a confirmation of the issued order/reservation, the waypoint provider message module 295 issues a confirmation message to the vehicle/occupants identified in the initial request received during 600.

During 640 the waypoint provider message module 295 notifies (possibly indirectly via a database entry or other triggering mechanism) the task scheduler 299 to invoke operation of the waypoint scheduling module 280 and the waypoint display module 290 to update their trip descriptions/displays in accordance with the newly added waypoint corresponding to the accepted/proposed POI resulting in the newly added order/reservation.

It is expressly noted that, in situations where acceptance of a proposed POI does not require invoking the waypoint provider message module 295, a resulting change in status of the currently configured identified trip will cause the task scheduler 299 to invoke operation of the waypoint scheduling module 280 and the waypoint display module 290 to update their trip descriptions/displays in accordance with the newly added waypoint corresponding to the accepted/proposed POI.

Figure 7:
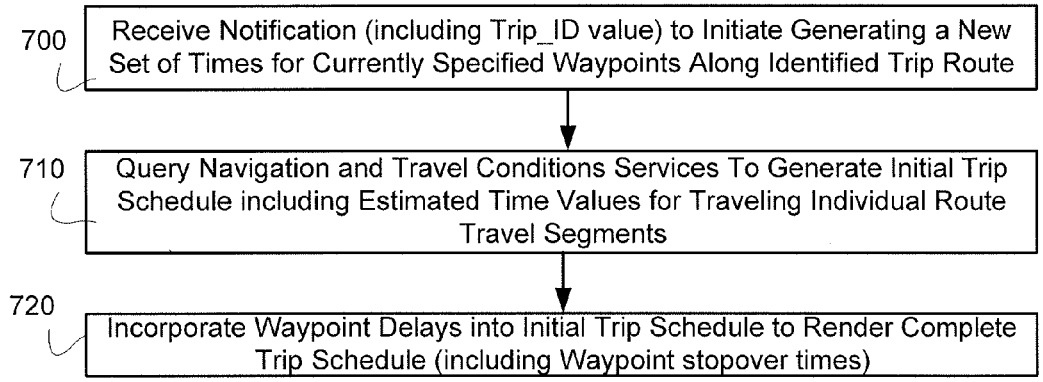
FIG. 7 is a flowchart summarizing a set of stages/operations for generating an updated trip schedule based upon a designated route and waypoints for an identified trip.

Turning to FIG. 7, a set of steps summarize, by way of example, operation of the waypoint scheduling module 280. The waypoint scheduling module 280 combines the basic travel times along route segments (connecting scheduled waypoints) with specified stopover delays at each intermediate waypoint on the identified trip to provide a complete schedule, including all scheduled waypoints, on the trip. The waypoint scheduling module 280 draws information from a variety of sources (e.g. the navigation service 220, the travel conditions service 225, and the trip/waypoint/POI tables within the POI database and query engine 109) to render updated time estimates for reaching and completing stops at scheduled waypoints on defined routes of identified trips. The scheduling module 280 accesses information relating to an identified trip, including: a current route, current road conditions (traffic congestion, road construction and weather), current time, current vehicle location, and a list of currently scheduled waypoints.

In general, the task scheduler module 299 invokes the waypoint scheduling module 280 in response to any one of a variety of exemplary triggering events mentioned herein that affect at least one assigned waypoint/endpoint timing estimate in a currently configured trip route of an identified trip. Such timing estimate recalculations occur, for example, when a new POI is selected as a waypoint on the identified trip. Other examples include: a changed time of arrival at a destination, a change in an appointment calendar entry corresponding to an identified waypoint on the currently identified business road trip, a change in traffic congestion status on a portion of the trip route between the current location of the vehicle and a next scheduled waypoint, etc. The task scheduler module 299, POI rater module 260, or proposed POI module 270 may also invoke the waypoint scheduling module 280 to provide an estimated new set of waypoint arrival times based upon a contemplated (proposed) POI that has not yet been accepted by a user. Other potential examples of triggering events causing the task scheduler module 299 to invoke the waypoint scheduling module 280 will be evident in view of the disclosure contained herein.

With particular reference to FIG. 7, during 700 the scheduling module 280 receives a notification from the task scheduler module 299 including at least a Trip_ID value identifying a trip for which an updated set of waypoint arrival time estimates are requested. After receiving the request, during 710 the scheduling module 280 initially queries the navigation service 220 and the travel conditions service 225 to update the route segment durations.

Thereafter, during 720, the scheduling module incorporates delays/durations corresponding to the planned/estimated stopping time at each waypoint contained in the designated waypoints 418 for the identified trip. Additionally, during 720 the scheduling module 280 updates the time of arrival 436 and time of departure 438 for each waypoint contained in the designated waypoints 418. Upon completion of the operation summarized in FIG. 7 waypoint data structures associated with the identified trip have been updated with recent trip route and traffic information to provide an estimate of times of arrival and departure at each waypoint along a trip route.

Figure 8:
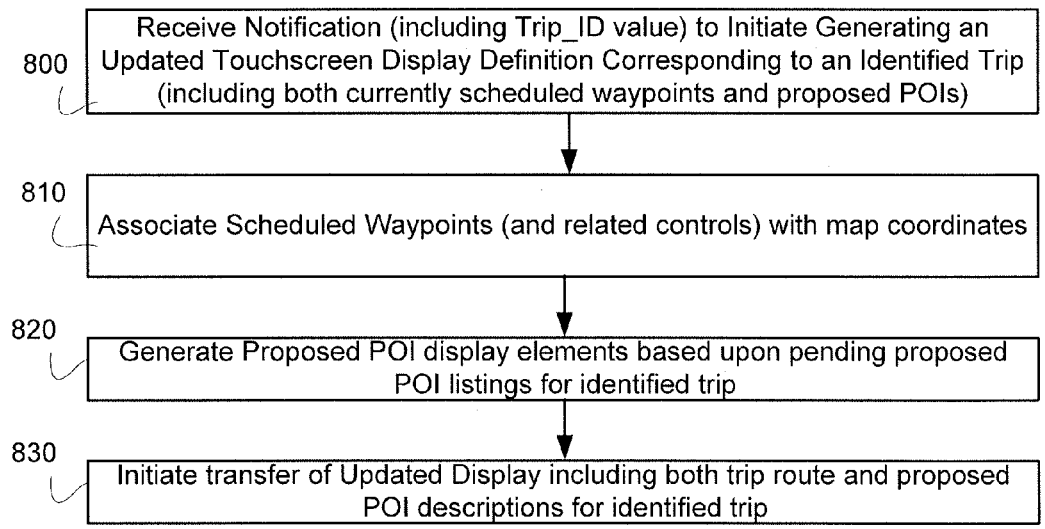
FIG. 8 is a flowchart summarizing a set of stages/operations for generating an updated trip display based upon a designated route and waypoints for an identified trip.

Turning to FIG. 8, a set of steps summarize, by way of example, operation of the waypoint display module 290 configured to provide, to a particular vehicle for presentation to vehicle occupants, a touchscreen user interface display description for an identified trip. The display description includes a currently configured set of waypoints on a current trip route corresponding to the identified trip. In an exemplary embodiment, operation of the waypoint display module 290 is triggered in response to receiving a notification of a trip schedule update event corresponding to the update of the particular trip record in the POI database and query engine 109 by the waypoint scheduling module 280 as a result of selection of one or more proposed POIs. The waypoint display module 290 is also configured to provide for local presentation (audio and/or visual output) alert messages and any other notifications relating to scheduled waypoints, including displaying information relating to an approaching waypoint contained in or relating to a corresponding waypoint record (see e.g., FIG. 3E).

With specific reference to FIG. 8, during 800 the waypoint display module 290 is invoked by the waypoint server task scheduler 299 issuing a request to provide an updated display definition, including updated screen(s) and underlying linked data represented in the view, for an identified trip. During 810, the waypoint display module 290, based upon the provided trip identification, obtains: (1) a list of currently scheduled waypoints on the identified trip (rendered by the scheduling module 280), and (2) a listing of proposed POIs for the identified trip (rendered by the proposed POI module 270 and stored in the proposed POIs 426).

During 810, the waypoint display module 290 associates each currently scheduled waypoint with a map coordinate for rendering on a graphical display output depicting a map including: (1) a trip route that passes through all scheduled waypoints and (2) a set of nodes corresponding to each one of the currently scheduled waypoints. During 820, the waypoint display module 290 generates proposed POI overlays based upon the proposed POI 426 listings associated with the identified trip. Thereafter, during 830, the waypoint display module 290 initiates transfer of the updated display definition to the vehicle associated with the identified trip. The resulting display definition is processed by the telematics unit and rendered on the touchscreen display 117.

Exemplary graphical map output generated by the telematics unit 114 and presented on the display 117 is depicted in FIGS. 9 and 10. FIG. 9 provides an exemplary single proposed POI overlay, on a current trip route map, including a touchscreen control button ("Let's Go") enabling a vehicle occupant to accept the invitation to add a coffee shop as a waypoint on a current trip route. A current destination is indicated as a star symbol on the displayed map. The proposed POI (Joe's Coffee time) is indicated by a bulls-eye symbol enabling the user to easily gauge the level of convenience in reaching the proposed POI based upon the currently contemplated route to a meeting (indicated by the star symbol). The proposed POI interface also includes an indicator that automated messaging is available (if selected) to place an order for the user at the indicated proposed POI). The exemplary POI proposal touchscreen interface includes a like/dislike (thumbs up/down) control for each listed proposed POI. A user selecting either like/dislike invokes a message transmission procedure resulting in the like/dislike to be recorded for the proposed POI in the liked/disliked proposed POI container 346 in data structure (see FIG. 3B) corresponding to the user that selected the like/dislike button.

FIG. 10 provides an exemplary presentation of a set of proposed POI associated with a "group POI" proposal including multiple proposed POIs associated with a single locality. The exemplary user interface includes features similar to those discussed herein above with reference to FIG. 9. The user is permitted to select, on an individual basis, the proposed POIs by touching a checkbox control (positioned to the left of each one of the proposed POIs in the exemplary graphical user interface overlay). Additionally, the exemplary user interface includes a "show more" control button associated with a proposed POI for a food category. The show more control button, provided for any category (e.g. gas, lodging) for which alternative proposed POI candidates are available, invokes a request to the system to provide a listing of alternative POIs for the same category that are located in the same vicinity of the group POI proposal (when selected by a vehicle occupant). A note provided by the system at the bottom of the proposed POI group listing indicates the availability of messaging for (reminding the user and/or actually issuing a message to the POI) placing a food (pizza) order at an appropriate time.

The described system, and in particular the server 145 and database 109 facilitate conducting analyses upon aggregated events across potentially many distinct sources of information relating to proposing and integrating potential POIs into a particular trip and related properties—including properties associated with the vehicle and occupants associated with the particular trip. Notably, the system facilitates limiting proposed POIs to a select few proposed POIs. The selection is guided by preferences of current vehicle occupants, current needs (expressed/inferred), scheduled arrival times at destinations, current driving conditions (affecting when destinations will be reached), etc. For example, the system bases selection of potential POIs based upon preferences of indicated vehicle occupants. However, if a potential POI will cause an unacceptable/unavoidable delay, then the potential POI is disqualified. This is only one example of the many "disqualifying" filters described herein that enable the system to present vehicle occupants with a greatly reduced number of requested/unsolicited proposed POIs while providing a valuable POI proposal service that is likely to be adopted and utilized on a full time basis (any time the vehicle is occupied) by vehicle occupants.

It will be appreciated by those of skill in the art that the execution of the various machine-implemented processes and steps described herein may occur via the computerized execution of computer-executable instructions stored on a tangible computer-readable medium, e.g., RAM, ROM, PROM, volatile, nonvolatile, or other electronic memory mechanism. Thus, for example, the operations performed by the telematics unit may be carried out according to stored instructions or applications installed on the telematics unit, and operation performed at the call center may be carried out according to stored instructions or applications installed at the call center.

It is thus contemplated that other implementations of the invention may differ in detail from foregoing examples. As such, all references to the invention are intended to reference the particular example of the invention being discussed at that point in the description and are not intended to imply any limitation as to the scope of the invention more generally. All language of distinction and disparagement with respect to certain features is intended to indicate a lack of preference for those features, but not to exclude such from the scope of the invention entirely unless otherwise indicated.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method, carried out on a waypoint server system, for incorporating a new waypoint, based upon a proposed place of interest (POI), into a current trip defined in a waypoint server system for a vehicle, the method comprising:
   configuring, on the waypoint server system, a trip definition for the current trip, the trip definition including:
      a current trip route to a destination,
      an estimated time of arrival (ETA) at the destination,
      a desired time of arrival at the destination, and
      a delay factor indicating a degree to which the ETA can exceed the desired time of arrival;
   determining, on the waypoint server system, a proposed POI for the trip definition based upon:
      the trip definition, and
      a collection of potential proposed POI instances; and
   issuing, by the waypoint server system through a mobile wireless network link to an in-vehicle user device, the proposed POI for presentation to a vehicle occupant;
   wherein during the determining, the waypoint server system processes the collection of potential proposed POI instances, to render the proposed POI, by:
      establishing POI ratings for individual ones of the collection of potential proposed POI instances, the POI rating for each individual POI of the collection of potential proposed POI instances being based at least in part upon:
         the delay factor, and
         an estimate of additional delay arising from adding the individual POI to the current trip route; and
      establishing a rank ordering of the individual ones of the collection of potential proposed POI instances based upon the POI ratings; and
      rendering the proposed POI from the rank ordering of the individual ones of the collection of potential proposed POI instances,
   wherein POI instances are categorized within the waypoint server system by POI type, and
   wherein the determining the proposed POI further comprise identifying a particular locality as a potential waypoint, and establishing a user selected group POI by selecting a POI type-specific POI instance for each one of a plurality of categories.

2. The method of claim 1 wherein POI instances are categorized within the waypoint server system by POI type, and
   wherein the determining the proposed POI further comprises assigning a need rating to a POI category for the proposed POI.

3. The method of claim 1 wherein the determining the proposed POI further comprises rendering a group POI rating for the group POI based upon individual ratings for each POI type-specific POI instance assigned to the group POI.

4. The method of claim 3 wherein the individual ratings are need ratings for POI categories corresponding to vehicle and occupant needs.

5. The method of claim 1 wherein the POI ratings for individual ones of the collection of potential proposed POI instances are based upon a plurality of factors.

6. The method of claim 1 further comprising filtering the collection of potential proposed POI instances based upon the delay factor, the desired time of arrival, and estimated time of arrival at the destination if the particular ones of the collection of potential proposed POI instances are added as new waypoints to the current trip.

7. The method of claim 1 further comprising:
   initiating a message transmission associated with the proposed POI, after the proposed POI is added as a new waypoint to the current trip, the message including information for a service request/order.

8. The method of claim 7 wherein the initiating the message transmission is coordinated with an estimated time of arrival at the proposed POI added as the new waypoint to the current trip.

9. A method, carried out on a waypoint server system, for incorporating a new way point, based upon a proposed place of interest (POI), into a current trip defined in a waypoint server system for a vehicle, the method comprising:
   configuring, on the waypoint server system, a trip definition for the current trip, the trip definition including:
      a current trip route to a destination,
      an estimated time of arrival (ETA) at the destination,
      a desired time of arrival at the destination, and
      a delay factor indicating a degree to which the ETA can exceed the desired time of arrival;
   determining, on the waypoint server system a proposed POI for the trip definition based upon:
      the trip definition, and
      a collectin of potential proposed POI instances; and
   issuing, by the waypoint server system through a mobile wireless network link to an in-vehicle user device, the proposed POI for presentation to a vehicle occupant;
   wherein during the determining, the waypoint server system processes the collection of potential proposed POI instances, to render the proposed POI, by:
      establishing POI ratings for individual ones of the collection of potential proposed POI instances, the POI rating fit each individual POI of the collection of potential proposed POI instances being based at least in part upon:
         the delay factor, and
         an estimate of additional delay arising from adding the individual POI to the current trip route; and
      establishing a rank ordering of the individual ones of the collection of potential proposed POI instances based upon the POI ratings; and
      rendering the proposed POI from the rank ordering of the individual ones of the collection of potential proposed POI instances,
   wherein the POI ratings for individual ones of the collection of potential proposed POI instances are based upon a plurality of factors, and
   wherein one of the plurality of factors is a degree of uniqueness of one of the collection of potential proposed POI instances.

10. The method of claim 9 wherein POI instances are categorized within the waypoint server system by POI type, and
    wherein the determining the proposed POI further comprises identifying a particular locality as a potential waypoint, and establishing a group POI by selecting a POI type-specific POI instance for each one of a plurality of categories.

11. The method of claim 9 wherein one of the plurality of factors is a sponsored promotional offer associated with one of the collection of potential proposed POI instances.

12. The method of claim 9 wherein one of the plurality of factors is based upon historical information recorded for a vehicle occupant within the vehicle.

13. A method, carried out on a wapoint server system, for incorporating a new waypoint, based upon a proposed place of interest (POI), into a current trip defined in a waypoint server system for a vehicle, the method comprising:
- configuring, on the wapoint server system, a trip definition for the current trip, the trip definition including:
  - a current trip route to a destination,
  - an estimated time of arrival (ETA) at the destination,
  - a desired time of arrival at the destination, and
  - a delay factor indicating a degree to which the ETA can exceed the desired time of arrival;
- determining, on the waypoint server system, a proposed POI for the trip definition based upon:
  - the trip definition, and
  - a collection of potential proposed POI instances; and
- issuing, by the waypoint server system through a mobile wireless network link to an in-vehicle user device, the proposed POI for presentation to a vehicle occupant;
- wherein during the determining, the waypoint server system processes the collection of potential proposed POI instances, to render the proposed POI, by:
  - establishing POI ratings for individual ones of the collection of potential proposed POI instances, the POI rating for each individual POI of the collection of potential proposed POI instances being based at least in part upon:
    - the delay factor, and
    - an estimate of additional delay arising from adding the individual POI to the current trip route; and
  - establishing a rank ordering of the individual ones of the collection of potential proposed POI instances based upon the POI ratings; and
- rendering the proposed POI from the rank ordering of the individual ones of the collection of potential proposed POI instances,
- wherein the method further comprises formulating a POI rating value for an individual one of the collection of potential proposed POI instances based upon the delay factor, the desired time of arrival, and estimated time of arrival at the destination if the individual one of the collection of potential proposed POI instances is added as a new waypoint to the current trip.

14. A method, carried out on a waypoint server system, for incorporating a new waypoint, based upon a proposed place of interest (POI), into a current trip defined in a waypoint server system for a vehicle, the method comprising:
- configuring, on the waypoint server system, a trip definition for the current trip, the trip definition including:
  - a current trip route to a destination,
  - an estimated time of arrival (ETA) at the destination,
  - a desired time of arrival at the destination, and
  - a delay factor indicating a degree to which the ETA can exceed the desired time of arrival;
- determining, on the waypoint server system, a proposed POI for the trip definition based upon:
  - the trip definition, and
  - a collection of potential proposed POI instances; and
- issuing, by the waypoint server system through a mobile wireless network link to an in-vehicle user device the proposed POI for presentation to a vehicle occupant;
- wherein during the determining, the waypoint server system processes the collection of potential proposed POI instances, to render the proposed POI, by:
  - establishing POI ratings for individual ones of the collection of potential proposed POI instances, the POI rating for each individual POI of the collection of potential proposed POI instances being based at least in part upon:
    - the delay factor, and
    - an estimate of additional delay arising from adding the individual POI to the current trip route; and
  - establishing a rank ordering of the individual ones of the collection of potential proposed POI instances based upon the POI ratings; and
- rendering the proposed POI from the rank ordering of the individual ones of the collection of potential proposed POI instances,
- wherein a particular value assigned for the delay factor is based upon a type of trip.

15. A method, carried out on a waypoint server system, for incorporating a new waypoint, based upon proposed place of interest (POI), into a current trip defined in a waypoint server system for a vehicle, the method comprising:
- configuring, on the waypoint server system, a trip definition for the current trip, the trip definition including:
  - a current trip route to a destination,
  - an estimated time of arrival (ETA) at the destination,
  - a desired time of arrival at the destination, and
  - a delay factor indicating a degree to which the ETA can exceed the desired time of arrival;
- determining, on the waypoint server system, a proposed POI for the trip definition based upon:
  - the trip definition, and
  - a collection of potential proposed POI instances; and
- issuing, by the waypoint server system through a mobile wireless network link to an in-vehicle user device the proposed POI for presentation to a vehicle occupant;
- wherein during the determining, the waypoint server system processes the collection of potential proposed POI instances, to render the proposed POI, by:
  - establishing POI ratings for individual ones of the collection of potential proposed POI instances, the POI rating for each individual POI of the collection of potential proposed POI instances being based at least in part upon:
    - the delay factor, and
    - an estimate of additional delay arising from adding the individual POI to the current trip route; and
  - establishing a rank ordering of the individual ones of the collection of potential proposed POI instances based upon the POI ratings; and
- rendering the proposed POI from the rank ordering of the individual ones of the collection of potential proposed POI instances,
- wherein during establishing POI ratings for individual ones of the collection of potential proposed POI instances, a value for a POI rating for a particular POI instance is based upon a type of trip.

16. The method of claim 15 wherein the type of trip is vacation.

17. A method carried out on a waypoint server system, for incorporating a new waypoint, based upon a proposed place of interest (POI), into a current trip defined in a waypoint server system for a vehicle, the method comprising:
- configuring, on the waypoint server system, a trip definition for the current trip, the trip definition including:
  - a current trip route to a destination,
  - an estimated time of arrival (ETA) at the destination,
  - a desired time of arrival at the destination, and
  - a delay factor indicating a degree to which the ETA can exceed the desired time of arrival;

determining, on the waypoint server system, a proposed POI for the trip definition based upon:
the trip definition, and
a collection of potential proposed POI instances; and
issuing, by the waypoint server system through a mobile wireless network link to an in-vehicle user device, the proposed POI for presentation to a vehicle occupant;
wherein during the determining, the waypoint server system processes the collection of potential proposed POI instances, to render the proposed POI, by:
establishing POI ratings for individual ones of the collection of potential proposed POI instances, the POI rating for each individual POI of the collection of potential proposed POI instances being based at least in part upon:
the delay factor, and
an estimate of additional delay arising from adding the individual POI to the current trip route; and
establishing a rank ordering of the individual ones of the collection of potential proposed POI instances based upon the POI ratings; and
rendering the proposed POI from the rank ordering of the individual ones of the collection of potential proposed POI instances,
wherein a frequency of presentation for proposed POI types is based upon at least one of the group consisting of: a type of trip, and a POI category.

18. A method, carried out on a waypoint server system, for incorporating a new waypoint, based upon a proposed place of interest (POI), into a current trip defined in a waypoint server system for a vehicle, the method comprising:
configuring, on the waypoint server system, a trip definition for the current trip, the trip definition including:
a current trip route to a destination,
an estimated time of arrival (ETA) at the destination,
a desired time of arrival at the destination, and
a delay factor indicating a degree to which the ETA can exceed the desired time of arrival;
determining, on the waypoint server system, a proposed POI for the trip definition based upon:
the trip definition, and
a collection of potential proposed POI instances; and
issuing, by the waypoint server system through a mobile wireless network link to an in-vehicle user device, the proposed POI for presentation to a vehicle occupant;
wherein during the determining, the waypoint server system processes the collection of potential proposed POI instances, to render the proposed POI, by:
establishing POI ratings for individual ones of the collection of potential proposed POI instances, the POI rating for each individual POI of the collection of potential proposed POI instances being based at least in part upon:
the delay factor, and
an estimate of additional delay arising from adding the individual POI to the current trip route; and
establishing a rank ordering of the individual ones of the collection of potential proposed POI instances based upon the POI ratings; and
rendering the proposed POI from the rank ordering of the individual ones of the collection of potential proposed POI instances,
wherein the method further comprises processing POI instances from the collection of potential proposed POI instances based upon a record of previous rejections/acceptances of proposed POI instances, wherein the processing POI instances comprises performing an action from the group consisting of: filtering POI instances identified as previously rejected; and adjusting a rating value assigned to POI instances based upon the record of previous rejections/acceptances.

19. A non-transitory computer-readable medium including computer-executable instructions for proposing, by a waypoint server system, a place of interest (POI) for incorporation as a new waypoint into a current trip defined in a waypoint server system for a vehicle, the computer-executable instructions facilitating performing, by the waypoint server system, the method comprising:
configuring, on the waypoint server system, a trip definition for the current trip, the trip definition including:
a current trip route to a destination,
an estimated time of arrival (ETA) at the destination,
a desired time of arrival at the destination, and
a delay factor indicating a degree to which the ETA can exceed the desired time of arrival;
determining, on the waypoint server system, a proposed POI for the trip definition based upon:
the trip definition, and
a collection of potential proposed POI instances; and
issuing, by the waypoint server system through a mobile wireless network link to an in-vehicle user device, the proposed POI for presentation to a vehicle occupant;
wherein during the determining, the waypoint server system processes the collection of potential proposed POI instances, to render the proposed POI, by:
establishing POI ratings for individual ones of the collection of potential proposed POI instances, the POI rating for each individual POI of the collection of potential proposed POI instances being based at least in part upon:
the delay factor, and
an estimate of additional delay arising from adding the individual POI to the current trip route;
establishing a rank ordering of the individual ones of the collection of potential proposed POI instances based upon the POI ratings; and
rendering the proposed POI from the rank ordering of the individual ones of the collection of potential proposed POI instances,
wherein POI instances are categorized within the waypoint server system by POI type, and
wherein the determining the proposed POI further comprises identifying a particular locality as a potential waypoint, and establishing a user selected group POI by selecting a POI type-specific POI instance for each one of a plurality of categories.

20. A waypoint server computer system for proposing a place of interest (POI) for incorporation as a new waypoint into a current trip defined for a vehicle, the waypoint server computer system comprising:
an electronic processor; and
a non-transitory computer-readable medium including computer-executable instructions that are executed by the electronic processor, the computer-executable instructions facilitating performing, by the waypoint server system, a method comprising:
configuring, on the waypoint server system, a trip definition for the current trip, the trip definition including:
a current trip route to a destination,
an estimated time of arrival (ETA) at the destination,
a desired time of arrival at the destination, and
a delay factor indicating a degree to which the ETA can exceed the desired time of arrival;

determining, on the waypoint server system, a proposed
POI for the trip definition based upon:
the trip definition, and
a collection of potential proposed POI instances; and
issuing, by the waypoint server system through a
mobile wireless network link to an in-vehicle user
device, the proposed POI for presentation to a
vehicle occupant;
wherein during the determining, the waypoint server
system processes the collection of potential proposed
POI instances, to render the proposed POI, by:
establishing POI ratings for individual ones of the
collection of potential proposed POI instances, the
POI rating for each individual POI of the collection of potential proposed POI instances being
based at least in part upon:
the delay factor, and
an estimate of additional delay arising from adding the individual POI to the current trip route;
establishing a rank ordering of the individual ones of
the collection of potential proposed POI instances
based upon the POI ratings; and
rendering the proposed POI from the rank ordering of
the individual ones of the collection of potential
proposed POI instances,
wherein POI instances are categorized within the waypoint server system by POI type, and
wherein the determining the proposed POI further comprises identifying a particular locality as a potential
waypoint, and establishing a group POI by selecting a
POI type-specific POI instance for each one of a
plurality of categories.

\* \* \* \* \*